(12) United States Patent
Nomiyama et al.

(10) Patent No.: US 11,444,539 B2
(45) Date of Patent: Sep. 13, 2022

(54) SWITCHING REGULATOR AND ELECTRONIC DEVICE INCLUDING THE SAME

(71) Applicant: Samsung Electronics Co., Ltd., Suwon-si (KR)

(72) Inventors: Takahiro Nomiyama, Seoul (KR); Ik-hwan Kim, Hwaseong-si (KR); Ji-seon Paek, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/120,756

(22) Filed: Dec. 14, 2020

(65) Prior Publication Data
US 2021/0099089 A1 Apr. 1, 2021

Related U.S. Application Data

(63) Continuation of application No. 16/585,290, filed on Sep. 27, 2019, now Pat. No. 10,910,949.

(30) Foreign Application Priority Data

Mar. 21, 2019 (KR) ........................ 10-2019-0032540

(51) Int. Cl.
*H02M 3/158* (2006.01)

(52) U.S. Cl.
CPC .......... *H02M 3/1584* (2013.01); *H02M 3/158* (2013.01)

(58) Field of Classification Search
CPC .... H02M 3/156; H02M 3/158; H02M 3/1588; H02M 3/155; H02M 3/1582;
(Continued)

(56) References Cited

U.S. PATENT DOCUMENTS 7,148,665 B2  12/2006  Agari et al.
7,446,517 B2  11/2008  Chen et al.
(Continued)

FOREIGN PATENT DOCUMENTS

JP        2012-244862 A    12/2012
WO   WO-2014/078482 A1     5/2014

OTHER PUBLICATIONS

Extended European Search Report dated Apr. 3, 2020 issued in European Patent Application No. 19203155.7-1201.

*Primary Examiner* — Bryan R Perez
(74) *Attorney, Agent, or Firm* — Harness, Dickey & Pierce, P.L.C.

(57) ABSTRACT

A switching regulator including a first converting stage and a second converting stage may be provided. The first converting stage may include a first output capacitor connected between a first output node and ground, the first converting stage configured to receive a first input voltage and provide an output voltage by adjusting a level of the output voltage based on a first dynamic voltage scaling (DVS) rate relating to a first load condition of a processing circuit. The second converting stage may include a second output capacitor connected between a second output node and the ground, the second converting stage configured to receive a second input voltage and provide the output voltage by adjusting the level of the output voltage based on a second DVS rate relating to a second load condition of the processing circuit, which is heavier than the first load condition of the processing circuit.

20 Claims, 19 Drawing Sheets

(58) Field of Classification Search
CPC .. H02M 3/157; H02M 3/1563; H02M 3/1584; H02M 1/32; H02M 2003/1566; H02M 2003/1557; H02M 2001/0012; H02M 2001/0009; H02M 2001/385; H04B 2215/069

See application file for complete search history.

(56) References Cited

U.S. PATENT DOCUMENTS

| | | |
|---|---|---|
| 8,525,500 B1 | 9/2013 | Martin |
| 9,350,244 B2 | 5/2016 | Tang et al. |
| 9,543,828 B2 | 1/2017 | Chen |
| 9,577,532 B2 | 2/2017 | Tournatory et al. |
| 9,742,280 B2 | 8/2017 | Childs et al. |
| 9,857,819 B1 * | 1/2018 | Lu ............................. G05F 1/62 |
| 2014/0285014 A1 | 9/2014 | Calhoun et al. |
| 2015/0028832 A1 * | 1/2015 | Tournatory ......... H02M 3/1584 323/271 |
| 2016/0211750 A1 | 7/2016 | Coleman et al. |
| 2016/0268898 A1 * | 9/2016 | Deboy ................. H02M 3/158 |
| 2018/0254706 A1 * | 9/2018 | Cheng ................. H02M 1/084 |
| 2019/0081546 A1 | 3/2019 | Hsu et al. |

\* cited by examiner

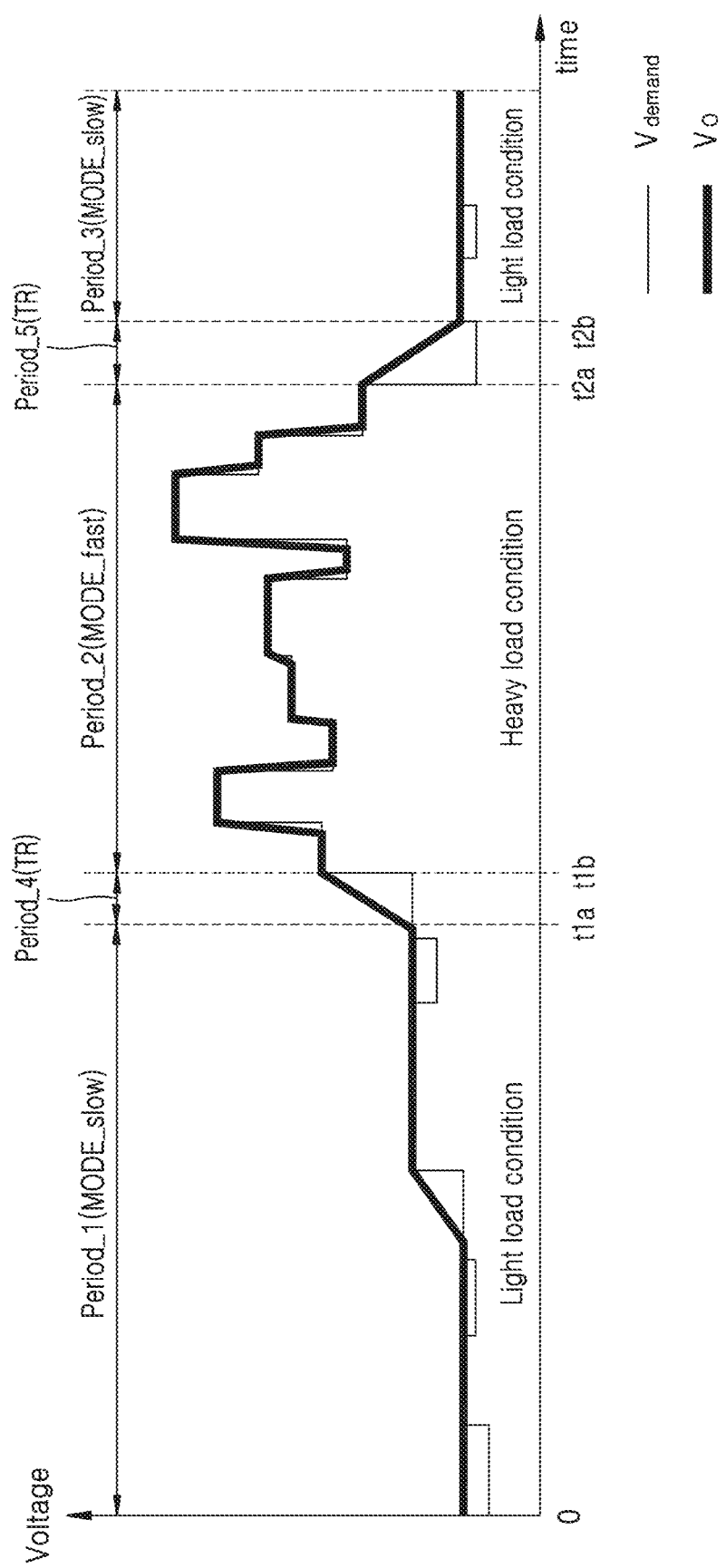

: disabled

SWITCHING REGULATOR AND ELECTRONIC DEVICE INCLUDING THE SAME

CROSS-REFERENCE TO RELATED APPLICATION

This application is a continuation of U.S. application Ser. No. 16/585,290, filed on Sep. 27, 2019, which claims the benefit of Korean Patent Application No. 10-2019-0032540, filed on Mar. 21, 2019, in the Korean Intellectual Property Office, the disclosure of each of which is incorporated herein in its entirety by reference.

BACKGROUND

The inventive concepts relate to generating supply voltages, and more particularly, to switching regulators and/or electronic devices including the same.

A supply voltage may be generated to provide power to electronic components, and a level of the supply voltage provided to the electronic components may be changed to reduce power consumption of the electronic components. For example, in the case of a processing circuit for processing digital signals, a lower level supply voltage may be provided when relatively low performance is desired according to a workload, while a higher level supply voltage is provided when relatively high performance is desired. Accordingly, studies are being made on a switching regulator that generates power voltages of various levels and enables an efficient use of electric power.

SUMMARY

The inventive concepts provide switching regulators for efficiently using electric power by varying a dynamic voltage scaling (DVS) rate of a supply voltage supplied to an electronic component for each workload of the electronic component, and/or electronic devices including the switching regulator.

According to an example embodiments of the inventive concepts, a switching regulator includes a first converting stage comprising a first output capacitor connected between a first output node and ground, the first converting stage configured to receive a first input voltage and provide an output voltage by adjusting a level of the output voltage based on a first dynamic voltage scaling (DVS) rate relating to a first load condition of a processing circuit, and a second converting stage comprising a second output capacitor connected between a second output node and the ground, the second converting stage configured to receive a second input voltage and provide the output voltage by adjusting the level of the output voltage based on a second DVS rate relating to a second load condition of the processing circuit, the second load condition of the processing circuit being heavier than the first load condition of the processing circuit.

According to an example embodiments of the inventive concepts, a switching regulator includes a first converting stage comprising a first output capacitor connected between a first output node and ground, the first converting stage configured to receive a first input voltage and provide an output voltage by adjusting a level of an output voltage based on a first dynamic voltage scaling (DVS) rate, a second converting stage comprising a second output capacitor connected between a second output node connected to an output terminal and the ground, the second converting stage configured to receive a second input voltage and provide the output voltage by adjusting the level of the output voltage based on a second DVS rate, and a first switch element connected between the first output node and the second output node, the first switch element configured to selectively connect the first converting stage to the output terminal.

According to an example embodiments of the inventive concepts, an electronic system includes at least one processing circuit, and a switching regulator configured to generate an output voltage from an input voltage and provide the output voltage to the processing circuit, the switching regulator including a plurality of converting stages, each of the plurality of converting stages including one or more output capacitors, the plurality of converting stages configured to adjust a level of the output voltage based on different dynamic voltage scaling (DVS) rates, and generate the output voltage by selecting at least one of the plurality of converting stages based on a load condition of the processing circuit.

BRIEF DESCRIPTION OF THE DRAWINGS

Example embodiments of the inventive concepts will be more clearly understood from the following detailed description taken in conjunction with the accompanying drawings in which:

FIGS. 5A and 5B are diagrams for explaining operations of a switching regulator according to some example embodiments of the inventive concepts, respectively;

DETAILED DESCRIPTION

In the present specification, "on" of a switch may refer to a state where both ends of the switch are electrically connected to each other, and "off" state of the switch may refer to a state where both ends of the switch are electrically disconnected from each other. Further, two or more components electrically connected via an on-state switch and/or a wire may be referred to as being simply connected, and two or more components electrically connected at all times via a wire, etc. may be referred to as being coupled.

Hereinafter, example embodiments of the inventive concepts are described in detail with reference to the accompanying drawings.

Figure 1:
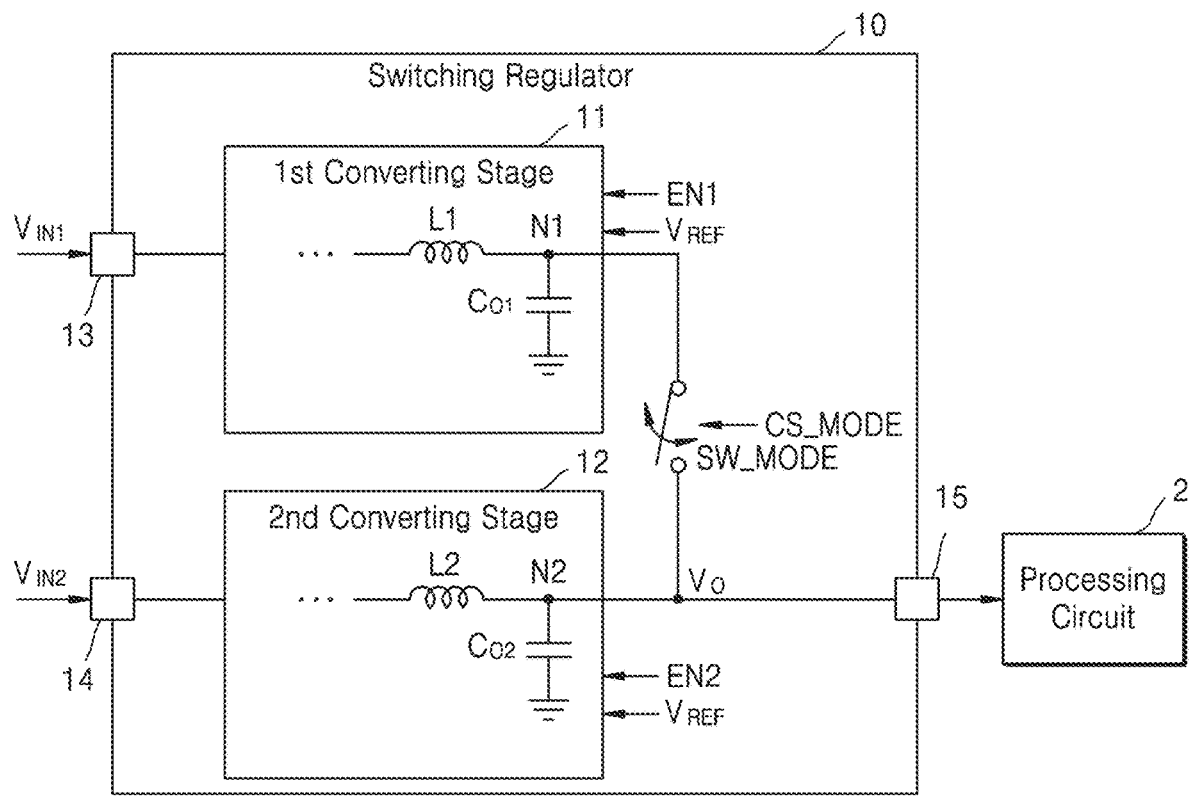
FIG. 1 is a block diagram illustrating an electronic device including a switching regulator according to an example embodiment of the inventive concepts.

FIG. 1 is a block diagram illustrating an electronic device 1 including a switching regulator 10 according to an example embodiment of the inventive concepts. The switching regulator 10 may receive a first input voltage $V_{IN1}$ and a second input voltage $V_{IN2}$ via first and second input terminals 13 and 14 and output an output voltage $V_O$ via an output terminals 15. The output voltage $V_O$ may be used as a supply voltage for other electronic components (or loads). Hereinafter, a processing circuit 2 is described as an example of an electronic component to which the output voltage $V_O$ of the switching regulator 10 is provided, but the example embodiment is only an example and example embodiments are not limited thereto. The output voltage $V_O$ may be provided to various electronic components such as a central processing unit (CPU), a graphics processing unit (GPU), and a camera.

As illustrated in FIG. 1, the switching regulator 10 may include a first converting stage 11, a second converting stage 12, and a mode switch element SW_MODE. In some example embodiments, components included in the switching regulator 10 may be included in one semiconductor package. In some example embodiments, the switching regulator 10 may include a printed circuit board (PCB), and at least two components of the switching regulator 10 may be mounted as separate semiconductor packages on the PCB. Further, the mode switch element SW_MODE may include various semiconductor elements.

The switching regulator 10 may refer to any electronic circuit that generates the output voltage $V_O$ by switching an element on/off. As an example of the switching regulator 10, a DC-DC converter may generate the output voltage $V_O$, which is a DC voltage from at least one of the first and second input voltages $V_{IN1}$ and $V_{IN2}$, which are DC voltages. For example, a buck converter may generate the output voltage $V_O$ of a lower level than the first input voltage $V_{IN1}$ or the second input voltage $V_{IN2}$, and accordingly, may be referred to as a step-down converter. A booster converter may generate the output voltage $V_O$ at a higher level than the first input voltage $V_{IN1}$ or the second input voltage $V_{IN2}$, and accordingly, may be referred to as a step-up converter. A buck-boost (or step-up/down) converter may generate an output voltage $V_O$ of a level lower or higher than the level of the first input voltage $V_{IN1}$ or the second input voltage $V_{IN2}$. Hereinafter, in the present specification, the switching regulator 10 is described with reference to a buck-boost DC-DC converter capable of generating the output voltage $V_O$ in various operation modes, but it should be understood that example embodiments of the inventive concepts may be applicable to the switching regulator 10 of other types such as an AC-DC converter in which the first input voltage $V_{IN1}$ or the second input voltage $V_{IN2}$ is an AC voltage. Further, the levels of the first input voltage $V_{IN1}$ and the level of the second input voltage $V_{IN2}$ may be the same as or different from each other according to example embodiments. Further, the level of the second input voltage $V_{IN2}$ may be greater than the level of the first input voltage $V_{IN1}$.

In some example embodiments, the switching regulator 10 may be set to one of a buck mode, a buck-boost mode, and a boost mode, depending on a target level of the output voltage $V_O$. As the switching regulator 10 supports at least one of the buck mode, the buck-boost mode, and the boost mode, the level of the output voltage $V_O$ may vary over a wide range. Further, each of the first converting stage 11 and the second converting stage 12 may include a configuration of various switching circuits (not shown) to support at least one of the buck mode, the buck-boost mode, and the boost mode.

The first converting stage 11 may receive the first input voltage $V_{IN1}$ from the first input terminal 13 and generate the output voltage $V_O$ from the first input voltage $V_{IN1}$. The first converting stage 11 may be configured to adjust the level of the output voltage $V_O$ based on a first DVS rate by including a first inductor L1, a first output capacitor $C_{O1}$, and a switching circuit (not shown). A DVS rate may refer to a speed at which the level of the output voltage $V_O$ is changed and may be referred to as DVS sensitivity. In other words, as the DVS rate increases, the level of the output voltage $V_O$ may change faster. Inductance of the first inductor L1 and capacitance of the first output capacitor $C_{O1}$ may be determined as values capable of performing a converting operation based on the first DVS rate. The first output capacitor $C_{O1}$ may be connected between one end of the first inductor L1 and the ground. A node where the first output capacitor $C_{O1}$ and the first inductor L1 are in contact with each other may be referred to as a first output node N1. A second output capacitor $C_{O2}$ may be connected between one end of a second inductor L2 and the ground. A node where the second output capacitor $C_{O2}$ and the second inductor L2 are in contact with each other may be referred to as a second output node N2.

The second converting stage 12 may receive the second input voltage $V_{IN2}$ from the second input terminal 14 and generate the output voltage $V_O$ from the second input voltage $V_{IN2}$. The second converting stage 12 may be configured to adjust the level of the output voltage $V_O$ based on the second DVS rate by including the second inductor L2, the second output capacitor $C_{O2}$, and a switching circuit (not shown). Inductance of the second inductor L2 and capacitance of the second output capacitor $C_{O2}$ may be determined as values capable of performing a converting operation based on the second DVS rate.

In an example embodiment, any one of the first converting stage 11 and the second converting stage 12 may be selected according to a workload condition of the processing circuit 2, and the output voltage $V_O$ may be generated by the selected converting stage and provided to the processing circuit 2 via the output terminal 15. When the processing circuit 2 is under a light load condition, the first converting stage 11 may be selected to generate the output voltage $V_O$, and when the processing circuit 2 is under a heavy load condition, the second converting stage 12 may be selected to produce the output voltage $V_O$. A light load condition may be a state where a workload level of a processing circuit is less than or equal to a reference voltage level (or a state where the processing circuit needs a voltage less than or equal to the reference voltage level), and a heavy load condition may be a state where the workload level of the processing circuit exceeds the reference voltage level (or a state where the processing circuit needs a voltage exceeding the reference voltage level). However, the example embodiment is only an example and example embodiments are not limited thereto. The switching regulator 10 may select a converting stage suitable for load conditions of more various processing circuits and generate the output voltage $V_O$.

Further, although only two converting stages are illustrated in FIG. 1, the example embodiment is only an example and example embodiments are not limited thereto. More converting stages may be included to perform a converting operation based on more various DVS rates, and accordingly, an efficient power usage may be feasible in various load conditions of the processing circuit.

Figure 2A:
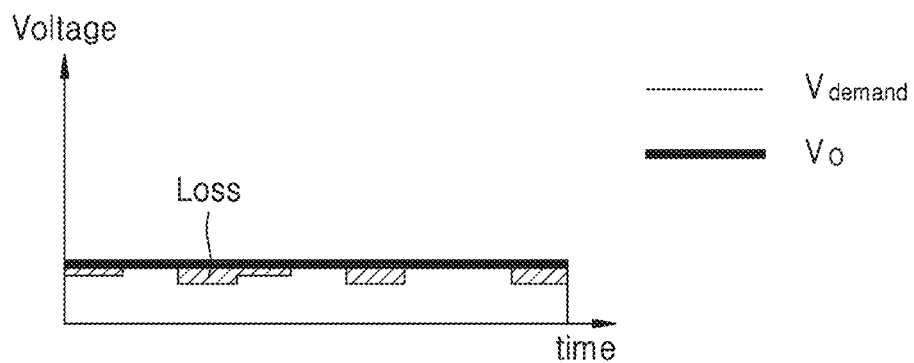
FIGS. 2A and 2B are diagrams for explaining losses when an output voltage generated by the same DVS rate-based converting operation is provided to a processing circuit without considering a load condition of the processing circuit in FIG. 1, respectively.
Figure 2B:
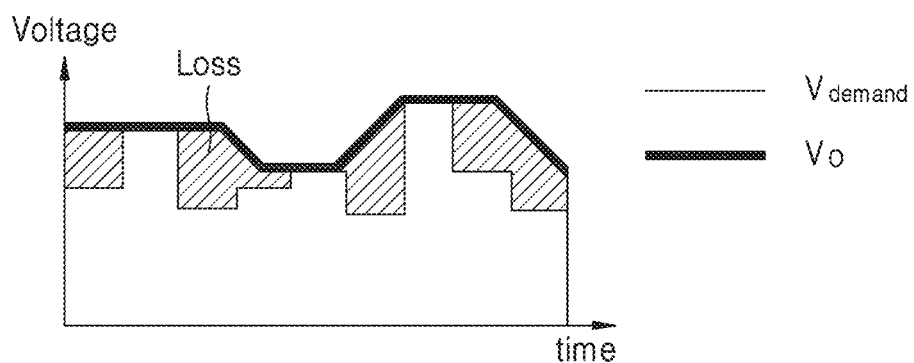

FIGS. 2A and 2B are diagrams for explaining losses when the output voltage $V_O$ generated by the same DVS rate-based converting operation is provided to the processing circuit 2 without considering load conditions of the processing circuit 2 in FIG. 1.

Referring to FIG. 2A, when the processing circuit 2 is under the light load condition, a level of a demand voltage $V_{demand}$ desired in the processing circuit 2 may be low. Thus, even though the output voltage $V_O$ having the DVS rate of a low degree, which is insensitive to a change of the demand voltage $V_{demand}$ along a time flow, is provided to the processing circuit 2, relatively small power loss Loss caused thereby may occur.

Referring to FIG. 2B, when the processing circuit 2 is in the heavy load condition, the level of the demand voltage $V_{demand}$ desired in the processing circuit 2 may be high. Thus, when the demand voltage $V_{demand}$ changes along the time flow and the output voltage $V_O$ having the DVS rate of a low level, which is insensitive to the change, is directly provided to the processing circuit 2, unlike the case in FIG. 2A, relatively large power loss Loss may occur. Such power loss Loss may deteriorate performance of the switching regulator, and further performance of the electronic device 1.

Referring back to FIG. 1, when the processing circuit 2 is under the light load condition, the first converting stage 11 may provide a first level of the output voltage $V_O$ to the processing circuit 2 after adjusting the level of the output voltage $V_O$ to meet a first desired voltage of the processing circuit 2 based on the relatively low first DVS rate. When the processing circuit 2 is under the heavy load condition, the second converting stage 12 may provide a second level of the output voltage $V_O$ to the processing circuit 2 after adjusting the level of the output voltage $V_O$ to meet a second desired voltage of the processing circuit 2 based on the relatively low first DVS rate. For example, when the processing circuit 2 is under the light load condition, the switching regulator 10 may connect the first converting stage 11 to the second output capacitor $C_{O2}$, and adjust the level of the output voltage $V_O$ by using the first output capacitor $C_{O1}$ and the second output capacitor $C_{O2}$, and when the processing circuit 2 is under the second load condition, the switching regulator 10 may adjust the level of the output voltage $V_O$ by using the second output capacitor Cm included in the second converting stage 12.

For example, the inductance of the first inductor L1 of the first converting stage 11 may be greater than the inductance of the second inductor L2 of the second converting stage 12, and the capacitance of the first output capacitor $C_{O1}$ of the first converting stage 11 may be greater than the capacitance of the second output capacitor Cm of the second converting stage 12. In FIG. 1, the second converting stage 12 includes one second inductor L2. However, example embodiment are not limited thereto, and various configurations as described below with reference to FIG. 7 may be applied.

In an example embodiment, to generate the output voltage $V_O$ by using a converting stage selected from the first converting stage 11 and the second converting stage 12, the mode switch element SW_MODE may be connected between the first output node N1 of the first converting stage 11 and the second output node N2 of the second converting stage 12. The second output node N2 may be connected (or, coupled) to the output terminal 15, and the first output node N1 may be connected (or, coupled) to the output terminal 15 via the mode switch element SW_MODE. Because the capacitance of the first output capacitor $C_{O1}$ is greater than the capacitance of the second output capacitor $C_{O2}$, the influence of the capacitance of the second output capacitor Coe during a converting operation of the first converting stage 11 may be limited compared with the influence of the capacitance of the first output capacitor $C_{O1}$. In the converting operation of the first converting stage 11, the first output capacitor $C_{O1}$ and the second converting stage 12 may be selectively disconnected by the mode switch element SW_MODE, and thus respective converting operations may be performed smoothly.

Figure 7:
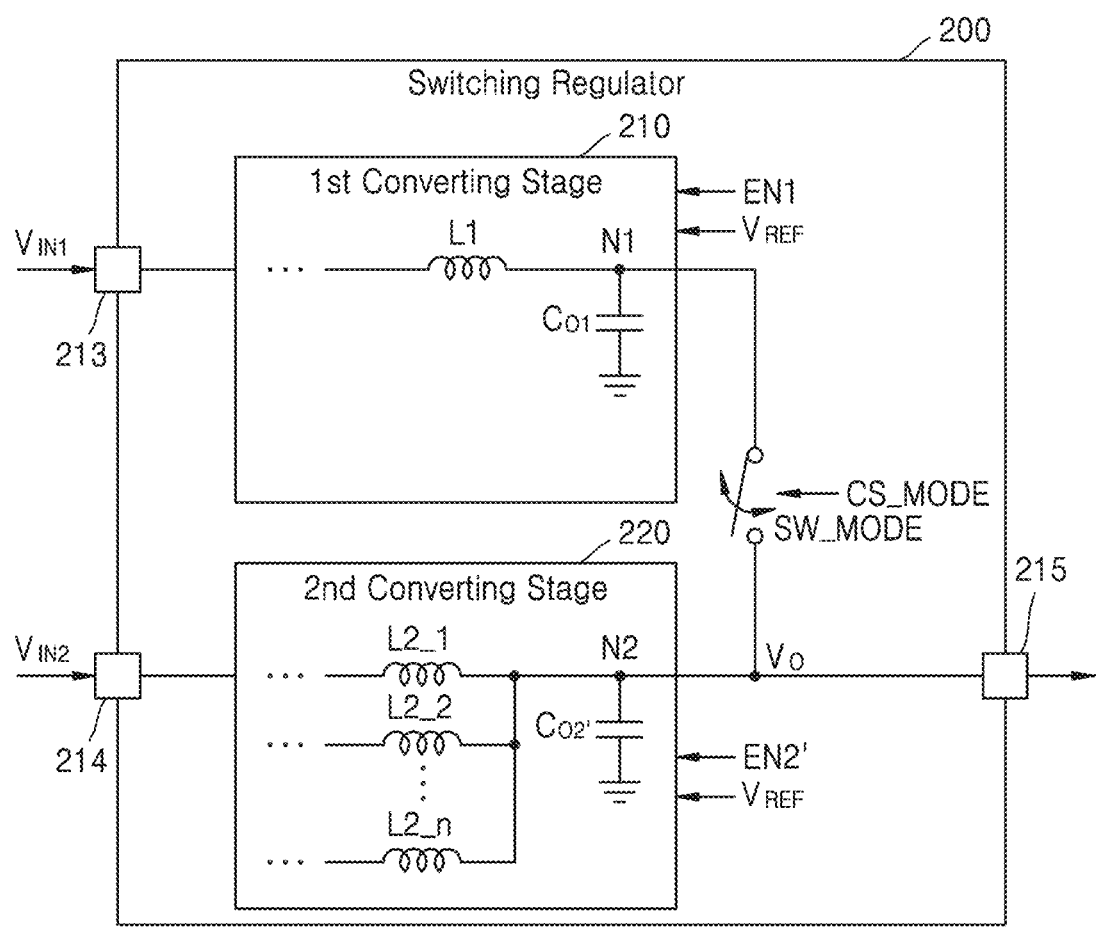
FIG. 7 is a block diagram illustrating a switching regulator according to an example embodiment of the inventive concepts.

In an example embodiment, under the light load condition of the processing circuit 2, the mode switch element SW_MODE may be turned on, the first output node N1 may be connected (or, coupled) to the output terminal 15, and the first converting stage 11 may provide the output voltage $V_O$ having the first DVS rate to the processing circuit 2 by performing the converting operation based on a first enable control signal EN1 (FIG. 7) and a reference voltage $V_{REF}$ (FIG. 7). In this case, the second converting stage 12 may be in a disabled state. Hereinafter, the disabled state may refer to a state where the first and/or second converting stages 11 and 12 are disconnected from the first and/or second input voltages $V_{IN1}$ and $V_{IN2}$. In other words, the disabled state may refer to a state where the first and/or second converting stages 11 and 12 are disconnected from the first and second input terminals 13 and 14. A converting mode of the switching regulator 10, which generates the output voltage $V_O$ by using the first converting stage 11, may be referred to as a slow mode.

Under the heavy load condition of the processing circuit 2, the mode switching element SW_MODE may be turned off, and the second converting stage 12 may provide the output voltage $V_O$ having the second DVS rate to the processing circuit 2 by performing the converting operation based on a second enable control signal EN2 (FIG. 7) and the reference voltage $V_{REF}$. In this case, the first converting stage 11 may be in the disabled state. The converting mode of the switching regulator 10, which generates the output voltage $V_O$ by using the second converting stage 12, may be referred to as a fast mode. In other words, a first speed of the slow mode of the switching regulator 200 may be slower than a second speed of the fast mode of the switching regulator 200.

Signals (EN1, EN2, $V_{REF}$, and mode control signal CS_MODE (FIG. 7)) for controlling the first converting stage 11, the second converting stage 12, and the mode switch element SW_MODE may be received directly from the processing circuit 2, or a controller (not shown) included in the switching regulator 10 may receive a certain signal from the processing circuit 2 and generate the signals (EN1, EN2, $V_{REF}$, and CS_MODE) based on the certain signal. Although not illustrated in FIG. 1, there may be more control signals desired to control the converting operation of the first converting stage 11 and the second converting stage 12. Such additional signals can be fully understood by one of ordinary skill in the art, and thus a detailed description thereof is omitted. The operation of the switching regulator 10 according to each load condition is described in detail with reference to FIGS. 6A through 6C, etc.

In an example embodiment, when the load condition of the processing circuit 2 changes while the switching regulator 10 provides the output voltage $V_O$ to the processing circuit 2, the converting stage for generating the output voltage $V_O$ may transition from one stage to another with an intervening transient stage in a transition period. In this case, the switching regulator 100 may enable both a first converting stage, which has generated the output voltage $V_O$ having a first level for a certain period of time before the load condition starts to changes, and a second converting stage, which is configured to generate the output voltage $V_O$ having a second level in accordance with the load condition to be changed, and simultaneously generate the output voltage $V_O$ having the first level and the output voltage having a second level during the transition period to perform a complementary converting operation. Details of this issue are described with reference to FIG. 5B, etc.

The switching regulator 10 according to some example embodiments may efficiently utilize power by providing an output voltage $V_O$ having a different DVS rate according to a load condition or a desired voltage level of an electronic component such as the processing circuit 2.

Figure 3:
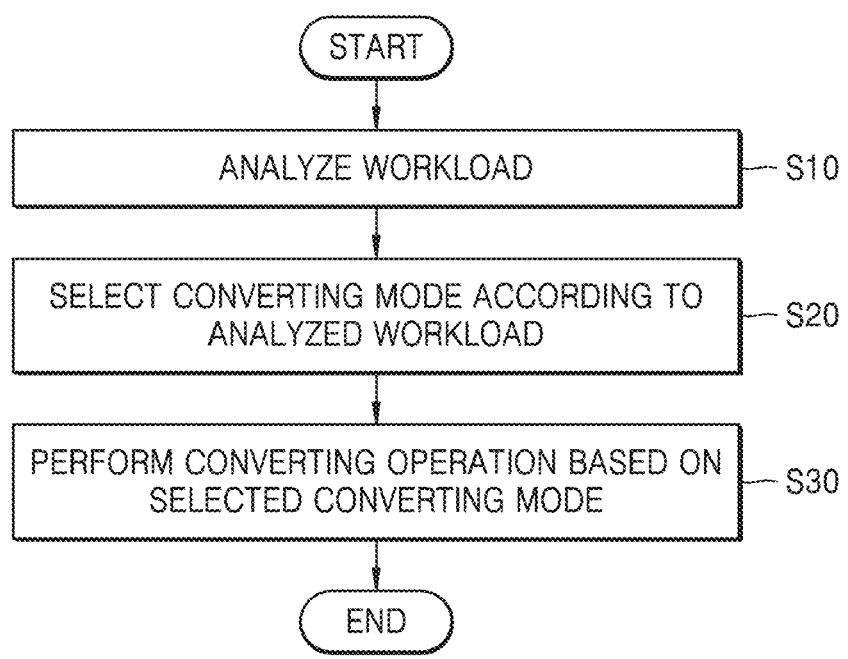
FIG. 3 is a flowchart of a converting operation of a switching regulator, according to an example embodiment of the inventive concepts.

FIG. 3 is a flowchart of the converting operation of the switching regulator 10 according to an example embodiment of the inventive concepts.

Referring to FIG. 3, a workload of the processing circuit 2 to which the output voltage $V_O$ of the switching regulator 10 is provided may be analyzed (S10). The workload of the processing circuit 2 may be analyzed in real time by the processing circuit 2, and the future workload may be estimated. The switching regulator 10 may select a converting mode according to the analyzed workload (S20). The switching regulator 10 may receive information about the analyzed workload from the processing circuit 2 and select a converting mode based thereon, or may directly receive a control signal related to the selection of the converting mode from the processing circuit 2 and select the conversion mode in response thereto. The converting mode may be defined according to the DVS rate of the output voltage $V_O$ of the switching regulator 10. In some example embodiments, the switching regulator 10 may include a plurality of converting stages each generating the output voltage $V_O$ having the different DVS rate, and each of the plurality of converting stages may include at least one output capacitor. Thereafter, the switching regulator 10 may perform the selected converting mode-based converting operation (S30). In other words, the switching regulator 10 may enable the converting stage that meets the selected conversion mode and generate and provide to the processing circuit 2 the output voltage $V_O$ having the DVS rate that is suitable for the workload of the processing circuit 2.

Figure 4:
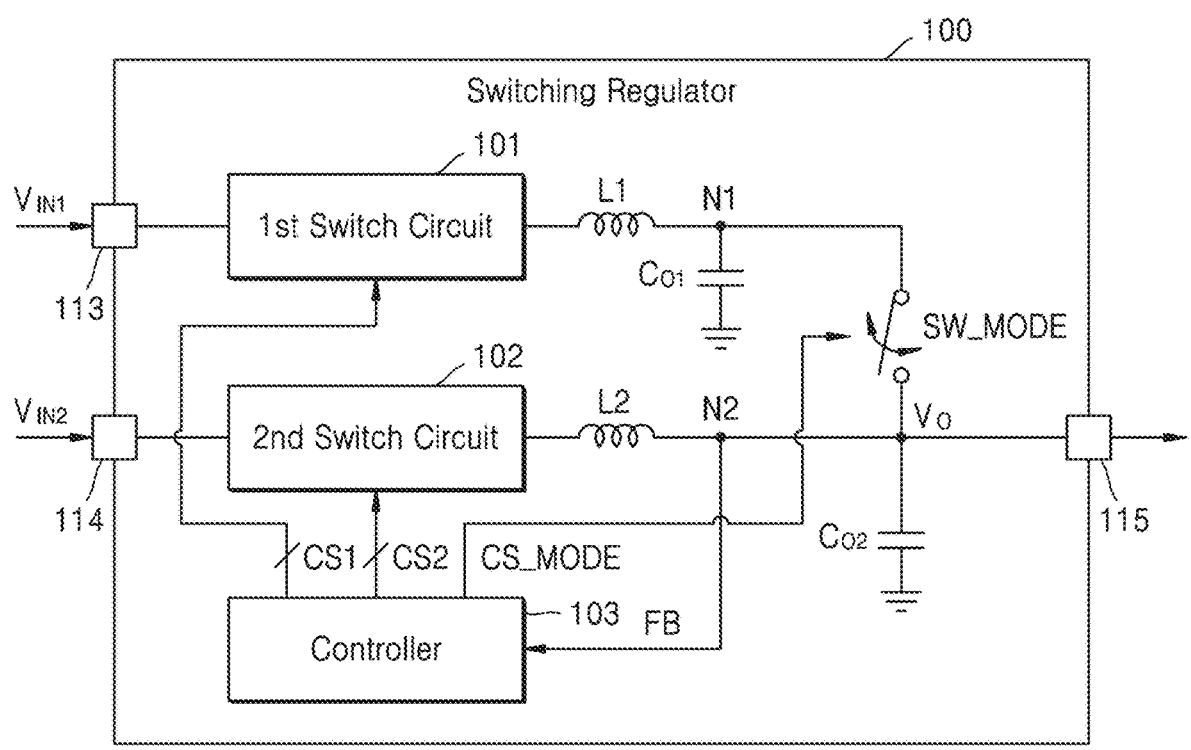
FIG. 4 is a block diagram illustrating a switching regulator according to an example embodiment of the inventive concepts.

FIG. 4 is a block diagram of a switching regulator 100 according to an example embodiment of the inventive concepts. In FIG. 4, descriptions have been given assuming that the converting operations are controlled by a controller 103. However, the example embodiment is only an example and example embodiments are not limited thereto, and various control examples may be applicable.

Referring to FIG. 4, the switching regulator 100 may include a first switch circuit 101, a second switch circuit 102, the controller 103, first and second inductors L1 and L2, first and second output capacitors $C_{O1}$ and $C_{O2}$, and a mode switch element SW_MODE. A configuration including the first switch circuit 101, the first inductor L1, and the first output capacitor $C_{O1}$ may correspond to the first converting stage 11 in FIG. 1, and a configuration including the second switch circuit 102, the second inductor L2, and the second output capacitor $C_{O2}$ may correspond to the second converting stage 12 in FIG. 1.

The controller 103 may receive the reference voltage $V_{REF}$ (not shown) from a processing circuit (not shown) and recognize the workload of the processing circuit, and accordingly, may selectively control any one of the first switch circuit 101 and the second switch circuit 102, and control the converting operation suitable for the workload of the processing circuit 2. In some example embodiments, the controller 103 may receive information about the workload from the processing circuit 2 as a separate signal and may control the converting operation based on the separate signal.

The controller 103 may control turning the mode switch element SW_MODE on/off by providing the mode control signal CS_MODE to the mode switch element SW_MODE according to the converting mode corresponding to the workload of the processing circuit 2, and may control the first switch circuit 101 or the second switch circuit 102 based on a feedback signal FB from the second output node N2 connected to the output terminal 115 and the reference voltage $V_{REF}$. A detailed description thereof is given below with reference to FIGS. 6A through 6C.

The controller 103 in the present disclosure may include processing circuitry such as hardware including logic circuits or a hardware-software combination such as a processor executing software. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The software may include a computer program, a piece of code, an instruction, or some combination thereof, to independently or collectively instruct and/or configure the controller 103 to operate as desired, thereby transforming the controller into a special purpose processor or a special purpose computer. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

Figure 5A:
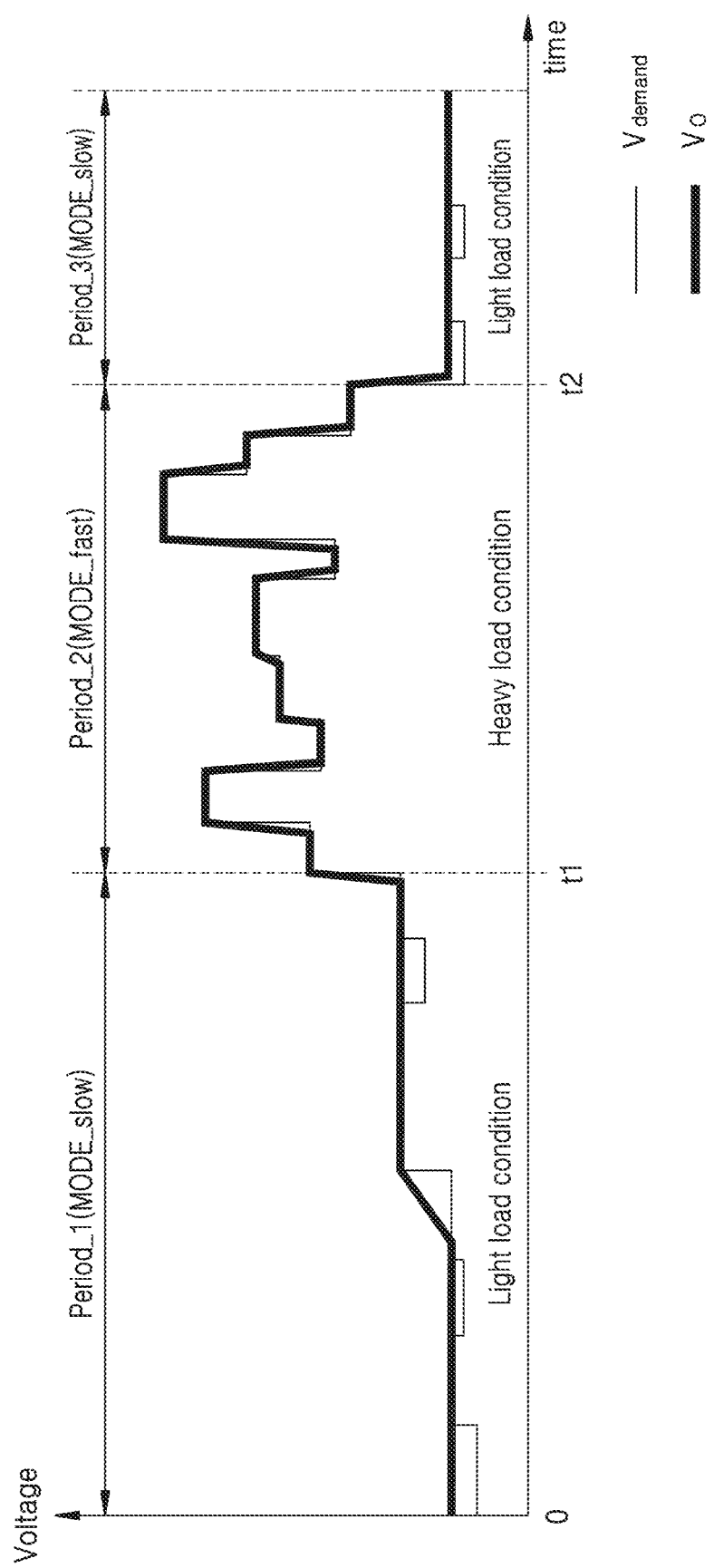
Figure 6A:
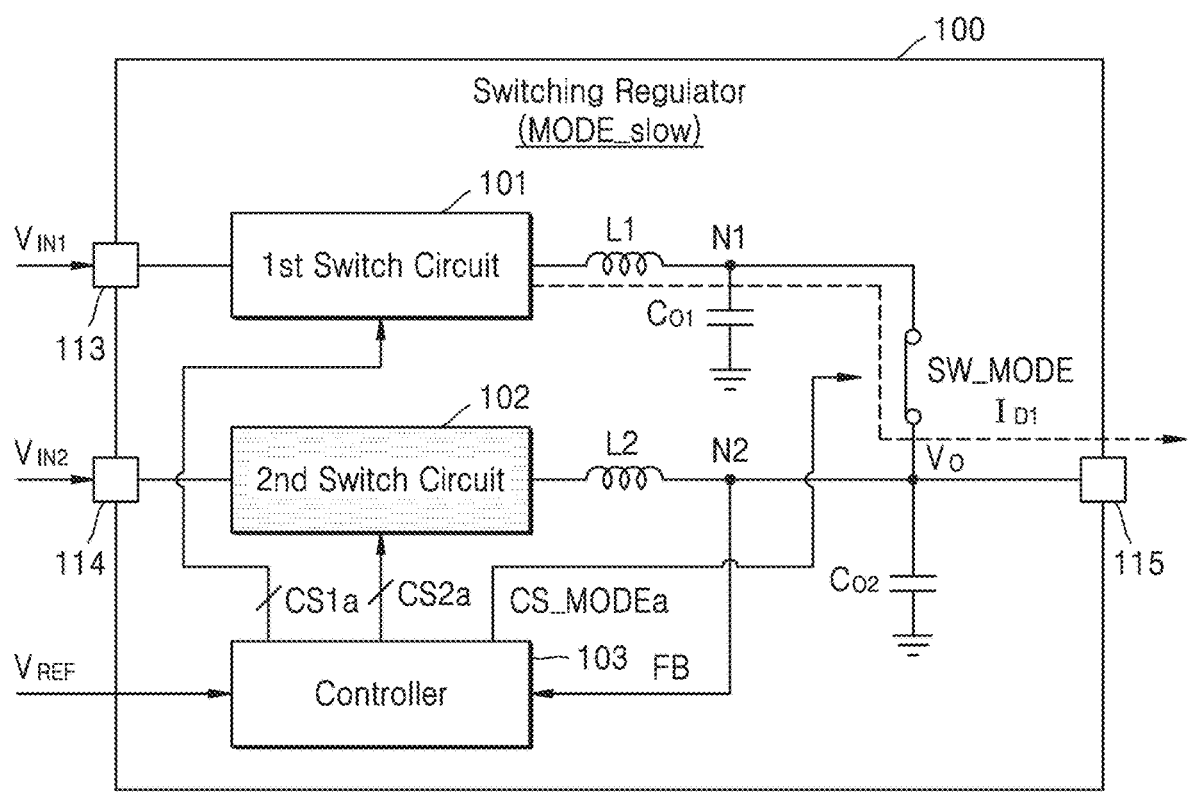
FIGS. 6A through 6C are block diagrams for explaining operations in converting modes of a switching regulator, respectively.
Figure 6B:
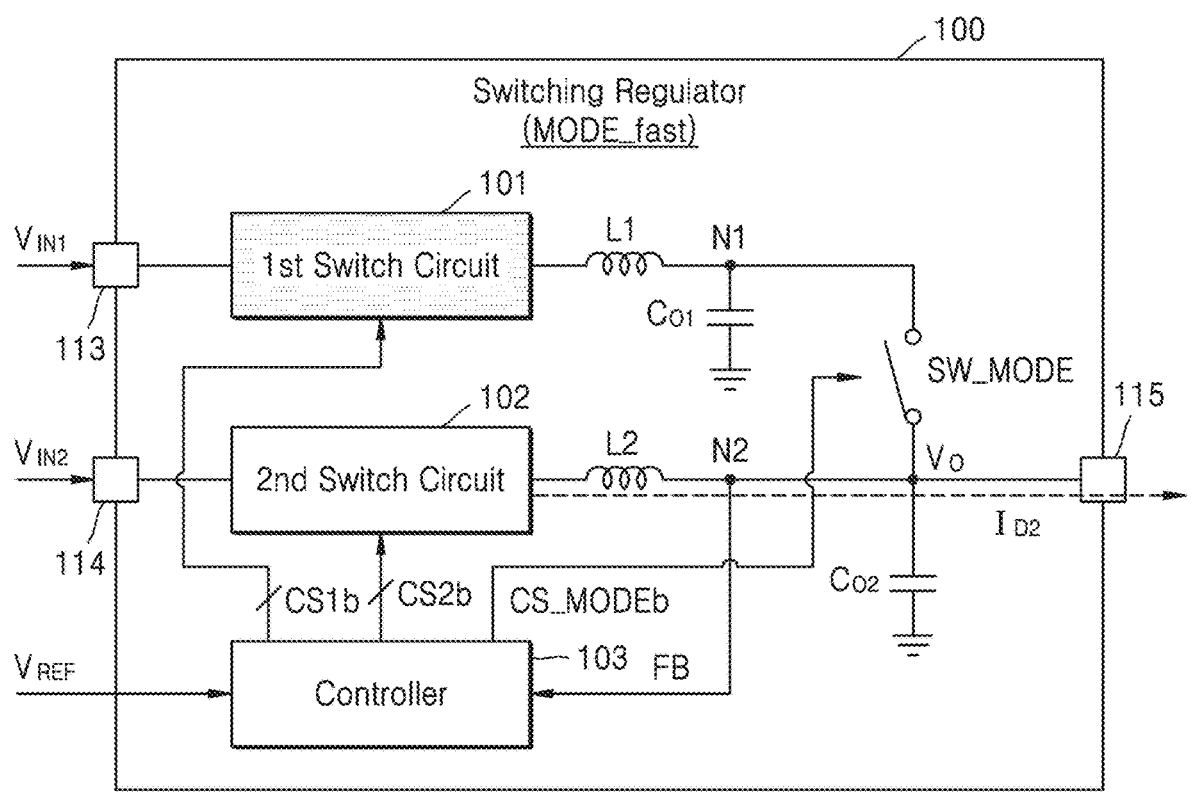
Figure 6B:
Figure 6C:
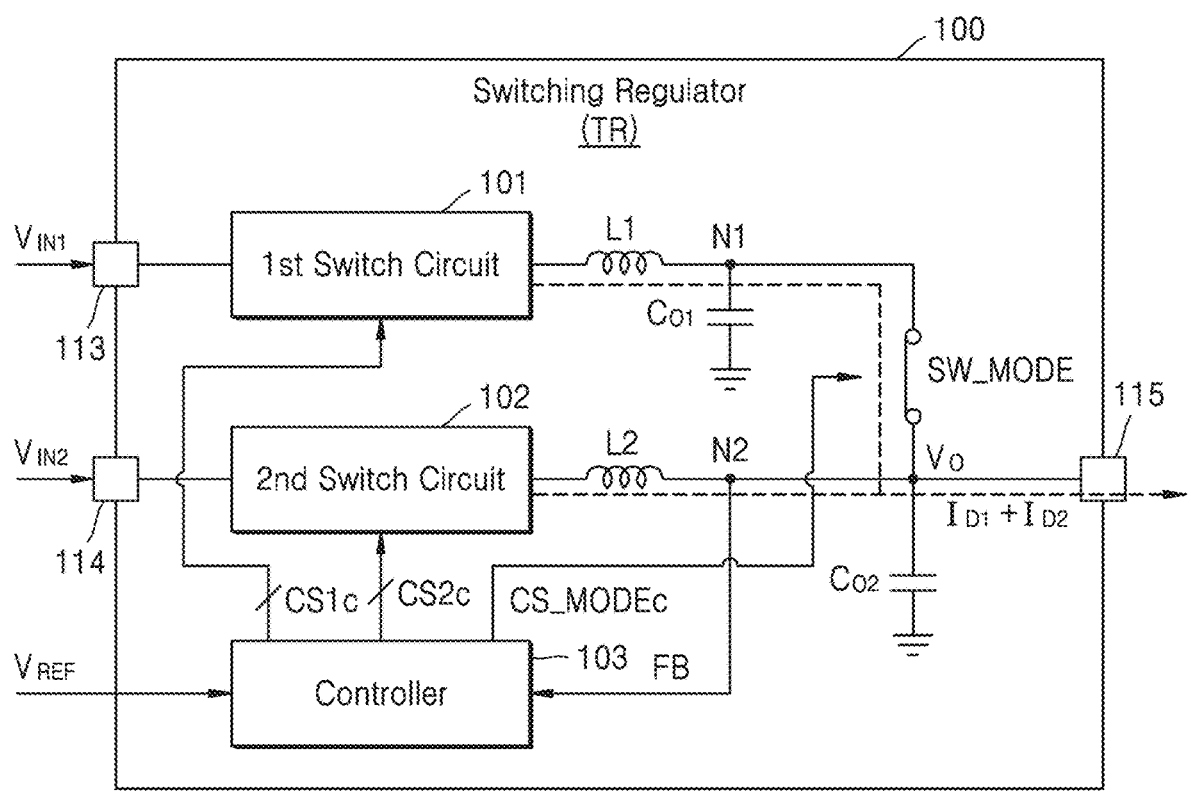

FIGS. 5A and 5B are example diagrams for explaining operations of the switching regulator 100 according to some example embodiments, respectively, and FIGS. 6A through 6C are block diagrams for explaining operations of the switching regulator 100 in converting modes, respectively.

Referring to FIG. 5A, the switching regulator 100 may perform a slow mode MODE_slow-based converting operation in a first period Period_1 corresponding to the light load condition of the processing circuit 2 In other words, the switching regulator 100 may generate and provide to the processing circuit 2 the output signal $V_O$ having the relatively low DVS rate that slowly tracks the demand voltage $V_{demand}$ of the processing circuit 2. Referring to FIG. 6A to describe the converting operation in the slow mode MODE_slow of the switching regulator 100, the controller 103 may turn on the mode switch element SW_MODE by providing a first mode control signal CS_MODEa to the mode switch element SW_MODE, may disable the second switch circuit 102 by providing a second control signal CS2a to the second switch circuit 102, and may provide the output voltage $V_O$ to the processing circuit 2 by providing a first control signal CS1a to the first switch circuit 101 and generating a first transfer current $I_{D1}$, which passes through the first inductor L1 and flows toward the output terminal 115, by using a switching control of the first switch circuit 101.

The switching regulator 100 may perform a fast mode MODE_fast-based converting operation in a second period Period_2 corresponding to the heavy load condition of the processing circuit 2. In other words, the switching regulator 100 may generate and provide to the processing circuit 2 the output signal $V_O$ having a relatively high DVS rate that quickly tracks the demand voltage $V_{demand}$ of the processing circuit 2. Referring to FIG. 6B to describe the converting operation in the fast mode MODE_fast of the switching regulator 100, the controller 103 may turn off the mode switch element SW_MODE by providing a second mode control signal CS_MODEb to the mode switch element SW_MODE, may disable the first switch circuit 101 by providing a first control signal CS1b to the first switch circuit 101, and may provide the output voltage $V_O$ to the processing circuit 2 by providing a second control signal CS2b to the second switch circuit 102 and generating a second transfer current $I_{D2}$, which passes through the second inductor L2 and flows toward the output terminal 115, by using a switching control of the second switch circuit 102.

Thereafter, the switching regulator 100 may perform the slow mode MODE_slow-based converting operation in a third period Period_3 corresponding to the light load condition of the processing circuit 2.

Referring further to FIG. 5B, as compared with the case in FIG. 5A, the switching regulator 100 may operate in a transition mode in certain time intervals (e.g., a fourth period Period_4 and a fifth period Period_5) during which converting modes change (or alternatively, during which the load conditions of the processing circuit 2 change), and may generate the output voltage $V_O$ by using a plurality of switch circuits (or alternatively, by using a plurality of converting stages). Referring to FIG. 6C to describe the converting operation in the transition mode TR of the switching regulator 100, the controller 103 may turn on the mode switch element SW_MODE by providing a third mode control signal CS_MODEc to the mode switch element SW_MODE, and may provide the output voltage $V_O$ to the processing circuit 2 by providing a first control signal CS1c to the first switch circuit 101 and a second control signal CS2c to the second switch circuit 102 and generating the first transfer current $I_{D1}$ and the second transfer current $I_{D2}$, which pass through the first inductor L1 and the second inductor L2, respectively, and flow toward the output terminal 115, by using the switching control of the first switch circuit 101 and the second switch circuit 102, respectively. The switching regulator 100 may generate and provide to the processing circuit 2 the stable output voltage $V_O$ by performing in parallel a converting operation of the first switch circuit 101 and a converting operation of the second switching circuit 102 during the transition period (e.g., by performing the converting operation of the first switch circuit 101, which has been in operation to generate the output voltage $V_O$ corresponding to a first load condition preceding the transition period, during the transition period until the second switch circuit 102 is enabled through the transition mode TR and stably generate the output voltage $V_O$ corresponding to a second load condition following the transition period.

FIG. 7 is a block diagram of a switching regulator 200 according to an example embodiment of the inventive concepts.

Referring to FIG. 7, the switching regulator 200 may include a first converting stage 210, a second converting stage 220, and a mode switch element SW_MODE. An inductor connection configuration of the first converting stage 210 may be different from that of the second converting stage 220. The first converting stage 210 may receive the first input voltage $V_{IN1}$ from the first input terminal 213 and generate the output voltage $V_O$ from the first input voltage $V_{IN1}$. The first converting stage 210 may include the first inductor L1, the first output capacitor $C_{O1}$, and a switching circuit (not shown) and may be configured to adjust the level of the output voltage $V_O$ based on the first DVS rate. A configuration of the first converting stage 210 may correspond to that of the first converting stage 11 in FIG. 1, and thus a detailed description thereof is omitted.

The second converting stage 220 may receive the second input voltage $V_{IN2}$ from the second input terminal 214 and generate the output voltage $V_O$ from the second input voltage $V_{IN2}$. The second converting stage 220 may be configured to adjust the level of the output voltage $V_O$ based on the second DVS rate by including a plurality of second inductors (L2_1 through L2_n), a second output capacitor $C_{O2'}$, and a plurality of switching circuits (not shown). One end of each of the second inductors (L2_1 through L2_n) may be connected to the second output node N2 in common. The second inductors (L2_1 through L2_n) may be connected to each other in parallel in the second converting stage 220. Further, the other end of each of the second inductors (L2_1 through L2_n) may be connected to one switching circuit (not shown). In an example embodiment, inductance of the second inductors (L2_1 through L2_n) and capacitance of the second output capacitor COT may be determined as values capable of performing a converting operation based on the second DVS rate. Further, the second inductors (L2_1 through L2_n) may have identical or different inductances, and each of the second inductors (L2_1 through L2_n) may have less inductance than the second inductor L2 in FIG. 1. All of the switching circuits (not shown) included in the second converting stage 220 may be collectively switch-controlled based on the same method, and thus provide the output voltage $V_O$ to the processing circuit (not shown) by generating transfer currents passing through the second inductors (L2_1 through L2_n).

A magnitude of the total transfer current passing through the second output node N2 may be increased by using a connection configuration of the second inductors (L2_1 through L2_n) of the second converting stage 220. Because the connection configuration of the second inductors (L2_1 through L2_n) occupies a relatively small area in the switching regulator 200 compared with the second inductor L2 in FIG. 1, utilization of a space inside the switching regulator 200 at a design stage may be improved.

When the certain processing circuit (not shown) to which the output voltage $V_O$ of the switching regulator 200 is provided is under the light load condition, the first converting stage 210 may be selected and the output voltage $V_O$ may be generated based on the first enable control signal EN1 and the reference voltage $V_{REF}$, and when the certain processing circuit (not shown) is under the heavy load condition, the second converting stage 220 may be selected and the output voltage $V_O$ may be generated based on a second enable control signal EN2' and the reference voltage $V_{REF}$.

Figure 8:
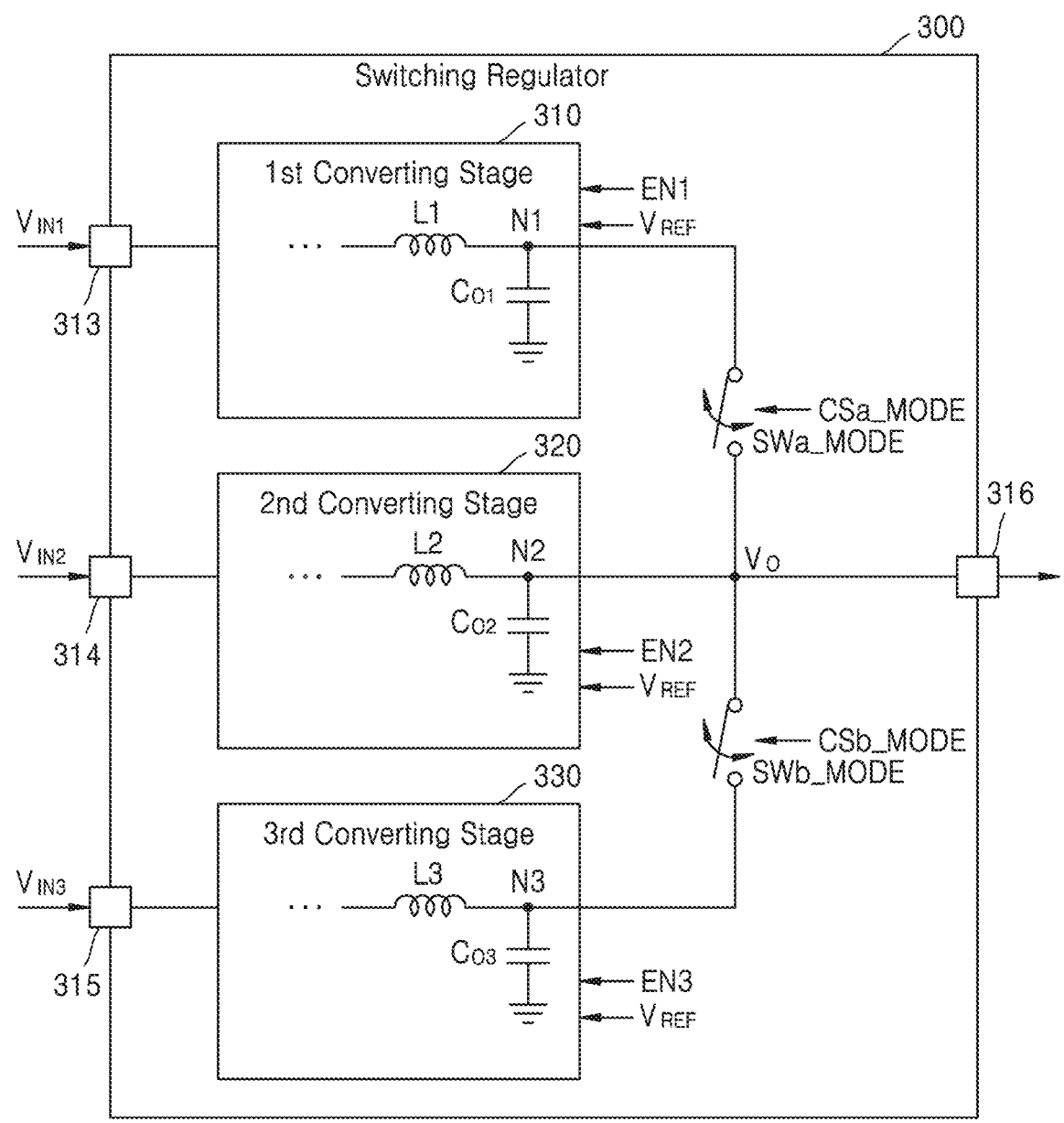
FIG. 8 is a block diagram illustrating a switching regulator according to an example embodiment of the inventive concepts.

FIG. 8 is a block diagram of a switching regulator 300 according to an example embodiment of the inventive concepts.

Referring to FIG. 8, the switching regulator 300 may include a first converting stage 310, a second converting stage 320, a third converting stage 330, a first mode switch element SWa_MODE, and a second mode switch element SWb_MODE. The switching regulator 300 may further include a third converting stage 330 and the second mode switch element SWb_MODE as compared with the switching regulator 10 in FIG. 1. Hereinafter, descriptions are given on a configuration different from that of the switching regulator 10 in FIG. 1.

The third converting stage 330 may receive a third input voltage $V_{IN3}$ from the third input terminal 315 and generate the output voltage $V_O$ from the third input voltage $V_{IN3}$. The third converting stage 330 may be configured to adjust the level of the output voltage $V_O$ based on a third DVS rate by including a third inductor L3, a third output capacitor $C_{O3}$, and a switching circuit (not shown). Inductance of the third inductor L3 and capacitance of the third output capacitor $C_{O3}$ may be determined as values capable of performing a converting operation based on the third DVS rate. In an example embodiment, the capacitance of the third output capacitor $C_{O3}$ may be less than that of the first output capacitor $C_{O1}$ and greater than that of the second output capacitor $C_{O2}$. Further, the inductance of the third inductor L3 may be less than that of the first inductor L1 and greater than that of the second inductor L2.

The third output capacitor $C_{O3}$ may be connected between one end of the third inductor L3 and the ground. A node where the third output capacitor $C_{O3}$ and the third inductor L3 are in contact with each other may be referred to as a third output node N3. Further, as described above, the first converting stage 310 may adjust the level of the output voltage $V_O$ based on the first DVS rate, and the second converting stage 320 may adjust the level of the output voltage $V_O$ based on the second DVS rate.

In an example embodiment, according to the workload condition of the processing circuit (not shown) to which the output voltage $V_O$ of the switching regulator 300 is provided, any one of the first converting stage 310, the second converting stage 320, and the third converting stage 330 may be selected, and the output voltage $V_O$ may be generated by the one or more selected converting stages and provided to the processing circuit (not shown) via an output terminal 316. When the processing circuit (not shown) is under the light load condition, the first converting stage 310 may be selected to generate the output voltage $V_O$. When the processing circuit (not shown) is under a normal (or alternatively, intermediate) load condition, the third converting stage 330 may be selected and the output voltage $V_O$ may be generated. When the processing circuit (not shown) is under the heavy load condition, the second converting stage 320 may be selected and the output voltage $V_O$ may be generated.

In this case, the light load condition may refer to a state in which the workload level of the processing circuit (not shown) is less than or equal to a first reference level (or, a state in which the processing circuit (not shown) desires a voltage less than or equal to the first reference voltage level), the normal (or alternatively, intermediate) load condition may refer to a state in which the workload level of the processing circuit (not shown) exceeds the first reference level and is less than or equal to a second reference level (or, a state in which the processing circuit (not shown) exceeds the first reference voltage level and desires a voltage less than or equal to the second reference voltage level), and the heavy load condition may refer to a state in which the workload level of the processing circuit (not shown) exceeds the second reference level (or, a state in which the processing circuit (not shown) desires a voltage exceeding the second reference voltage level).

In an example embodiment, under the normal load condition of the processing circuit (not shown), the third converting stage 330 may be selected by the first and second mode control signals CSa_MODE and CSb_MODE and may generate the output voltage $V_O$ having the third DVS rate based on the third enable control signal EN3 and the reference voltage $V_{REF}$. A detailed description thereof is given below with reference to FIGS. 10A through 10C.

Figure 9A:
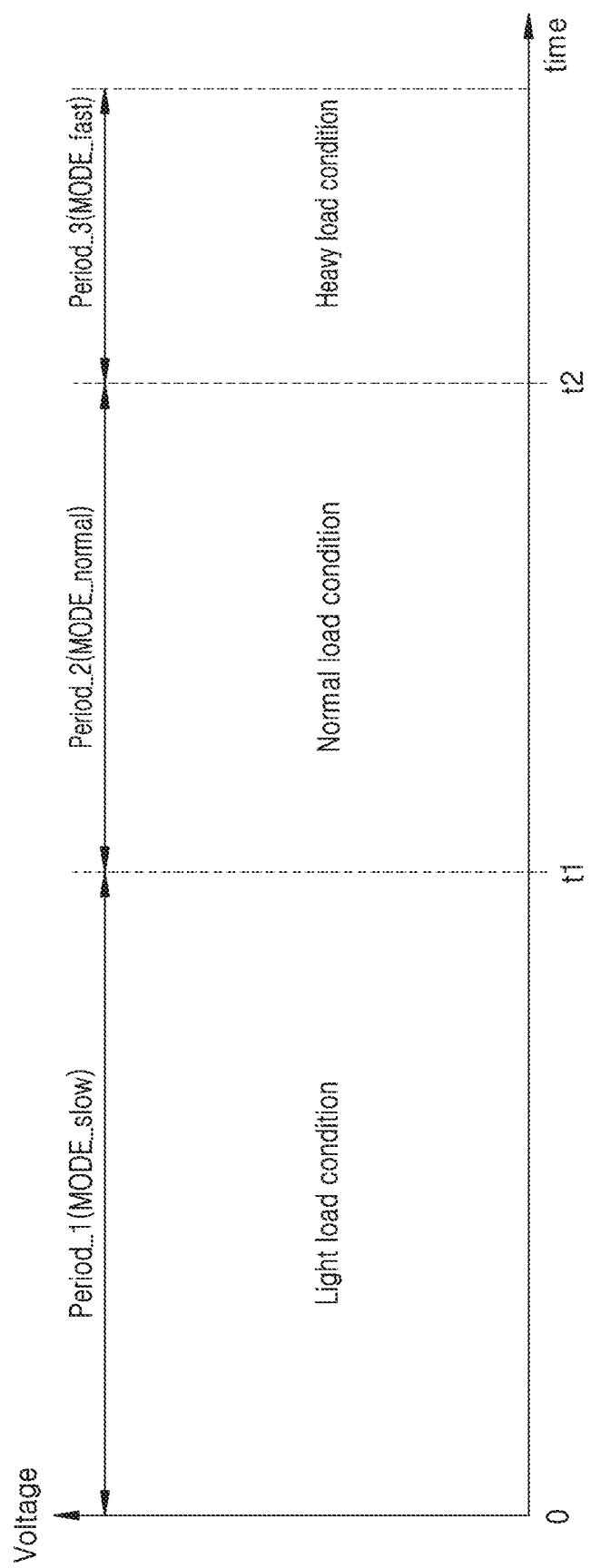
FIGS. 9A and 9B are diagrams for explaining operations of a switching regulator according to some example embodiments of the inventive concepts, respectively.
Figure 9B:
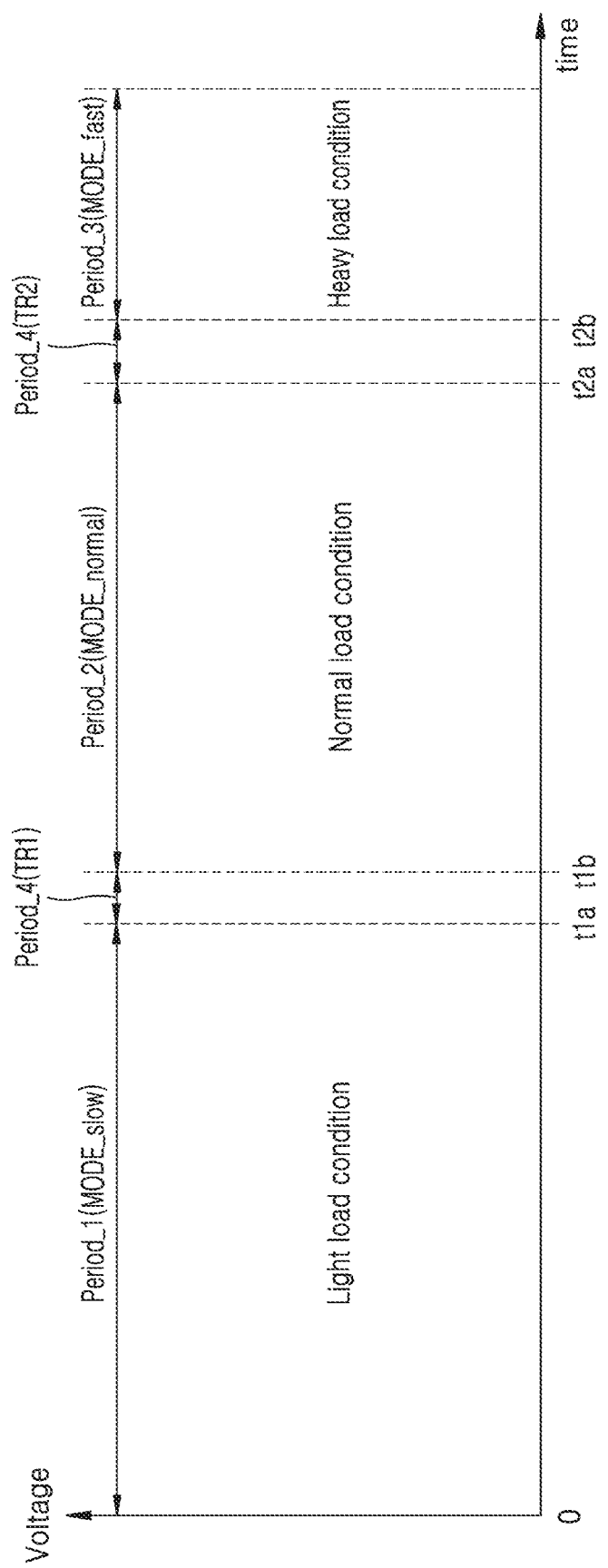

FIGS. 9A and 9B are example diagrams for explaining operations of the switching regulator 300 in FIG. 8 according to some example embodiments of the inventive concepts, respectively, and FIGS. 10A through 10E are block diagrams for explaining operations of the switching regulator 300 in respective converting modes.

Figure 10A:
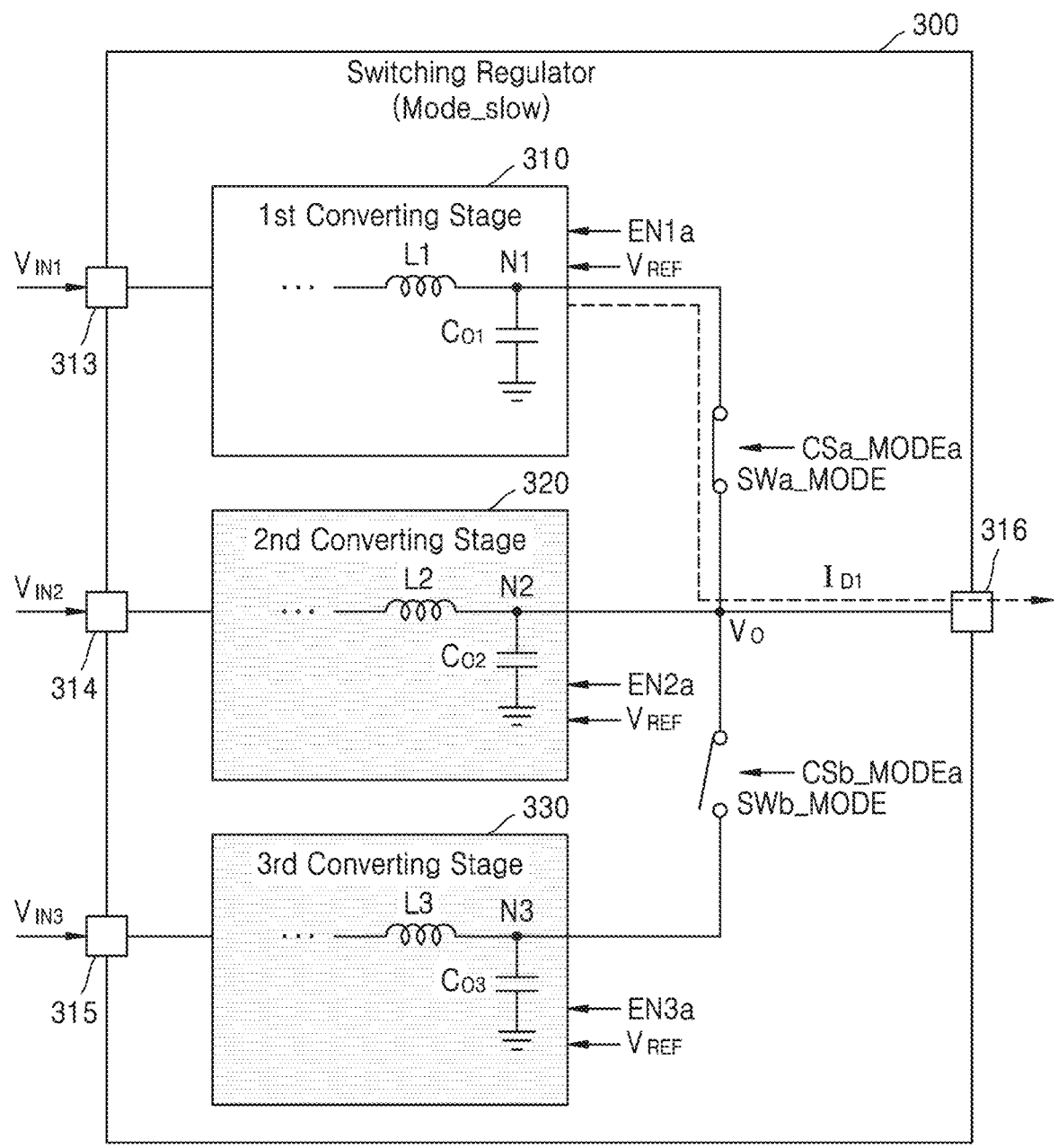
FIGS. 10A through 10E are block diagrams for explaining operations in converting modes of a switching regulator, respectively.

Referring to FIG. 9A, the switching regulator 300 may perform a slow mode MODE_slow-based converting operation in a first period Period_1 corresponding to the light load condition of the processing circuit (not shown). In other words, the switching regulator 300 may generate and provide to the processing circuit 2 the output signal $V_O$ having the relatively low first DVS rate at which the demand voltage $V_{demand}$ of the processing circuit (not shown) is slowly tracked. Referring to FIG. 10A for explaining the converting operation of the switching regulator 300 in the slow mode MODE_slow, in the slow mode MODE_slow, the first mode switch element SWa_MODE may be turned on by a first mode control signal CSa_MODEa, and the second mode switch element SWb_MODE may be turned off by a second mode control signal CSb_MODEa. Further, the first converting stage 310 may be enabled by a first enable control signal EN1a, the second converting stage 320 may be disabled by a second enable control signal EN2a, and the third converting stage 330 may be disabled by a third enable control signal EN3a. The first converting stage 310 may generate the first transfer current Iii that passes through the first inductor L1 and flows toward the output terminal 316 by performing the converting operation based on the first enable control signal EN1a and the reference voltage $V_{REF}$ and may provide the output voltage $V_O$ to the processing circuit (not shown).

Figure 10B:
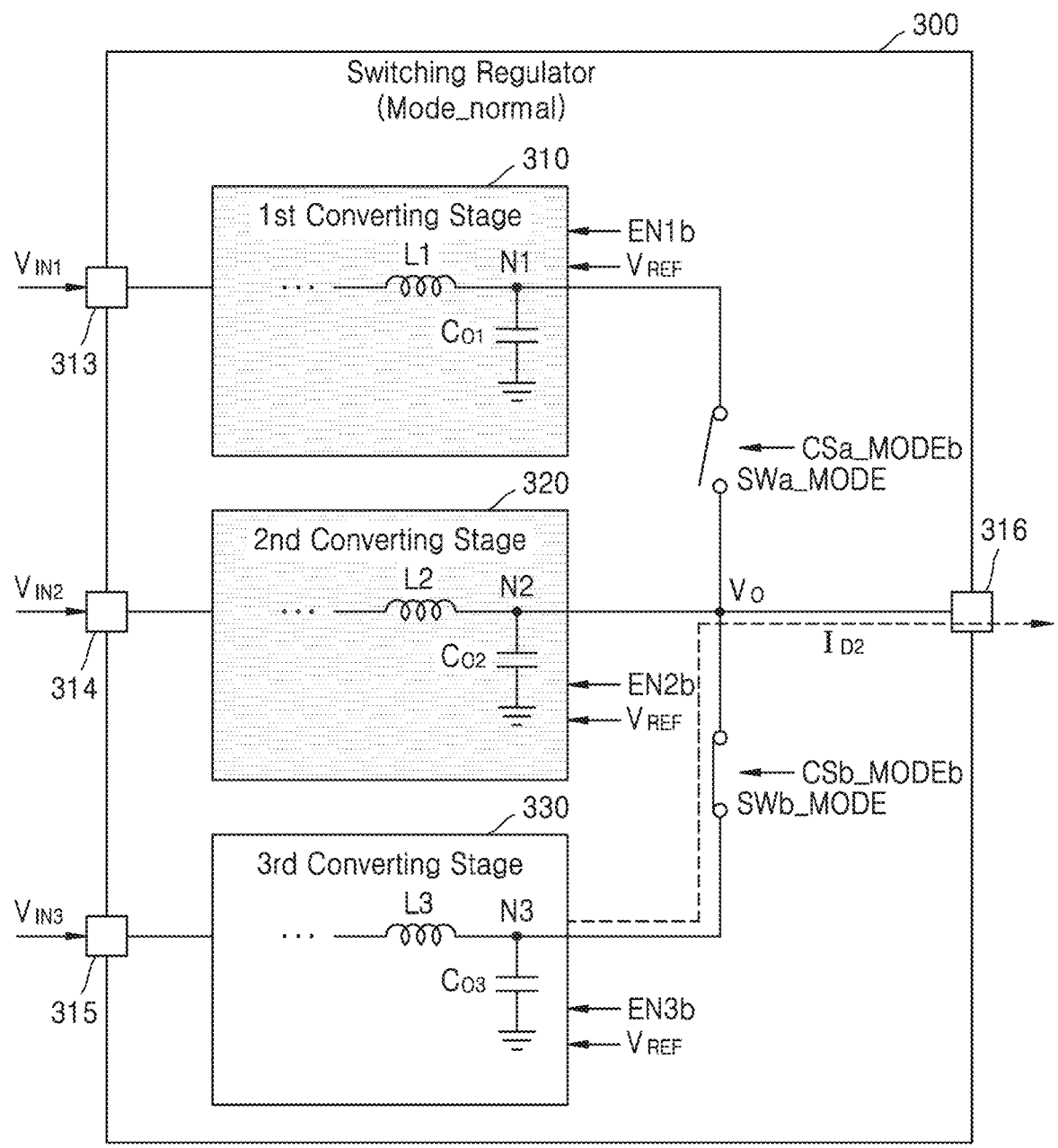

The switching regulator 300 may perform the normal mode MODE_normal-based converting operation in the second period Period_2 corresponding to the normal load condition of the processing circuit (not shown). In other words, the switching regulator 300 may generate and provide to the processing circuit (not shown) the output signal $V_O$ having the second DVS rate at which the demand voltage $V_{demand}$ of the processing circuit (not shown) is tracked at an intermediate speed. Referring to FIG. 10B for explaining the converting operation of the switching regulator 300 in the normal mode MODE_normal, in the normal mode MODE_normal, the first mode switch element SWa_MODE may be turned off by a first mode control signal CSa_MODEb, and the second mode switch element SWb_MODE may be turned on by a second mode control signal CSb_MODEb. Further, the first converting stage 310 may be disabled by a first enable control signal EN1b, the second converting stage 320 may be disabled by a second enable control signal EN2b, and the third converting stage 330 may be enabled by a third enable control signal EN3b. The third converting stage 330 may generate the second transfer current $I_{D2}$ that passes through the third inductor L3 and flows toward the output terminal 316 by performing the converting operation based on the third enable control signal EN3b and the reference voltage $V_{REF}$ and may provide the output voltage $V_O$ to the processing circuit (not shown).

Figure 10C:
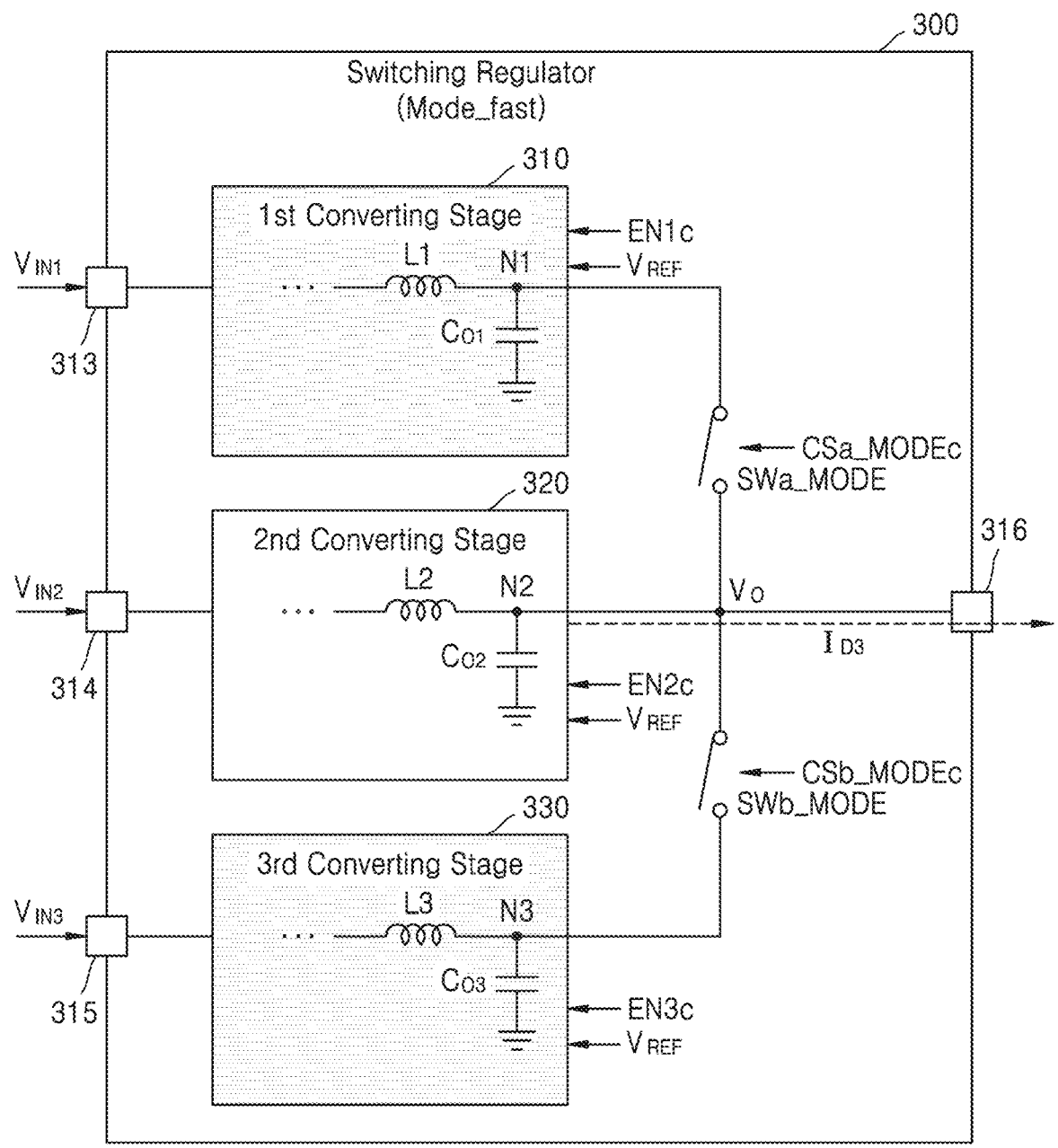

The switching regulator 300 may perform a fast mode MODE_fast-based converting operation in the third period Period_3 corresponding to the heavy load condition of the processing circuit (not shown). In other words, the switching regulator 300 may generate and provide to the processing circuit (not shown) the output signal $V_O$ having the relatively high third DVS rate at which the demand voltage $V_{demand}$ of the processing circuit (not shown) is tracked at a fast speed. Referring to FIG. 10C for explaining the converting operation of the switching regulator 300 in the fast mode MODE_fast, in the fast mode MODE_fast, the first mode switch element SWa_MODE may be turned off by a first mode control signal CSa_MODEc, and the second mode switch element SWb_MODE may be turned off by a second mode control signal CSb_MODEc. Further, the first converting stage 310 may be disabled by a first enable control signal EN1c, the second converting stage 320 may be enabled by a second enable control signal EN2c, and the third converting stage 330 may be disabled by a third enable control signal EN3c. The second converting stage 320 may generate a third transfer current $I_{D3}$ that passes through the second inductor L2 and flows toward the output terminal 316 by performing the converting operation based on the second enable control signal EN2c and the reference voltage $V_{REF}$ and may provide the output voltage $V_O$ to the processing circuit (not shown). In an example embodiment, magnitudes of the DVS rates may be, in descending order, the third DVS rate, the second DVS rate, and the first DVS rate.

Referring further to FIG. 9B, as compared with the case in FIG. 9A, the switching regulator 300 may operate in a first transition mode TR1 and a second transition mode TR2 in certain time intervals (e.g., fourth and fifth periods Period_4 and Period_5) that include timings when converting modes are changed (or, timings when the load conditions of the processing circuit 2 are changed), respectively, and may generate the output voltage $V_O$ by using a plurality of converting stages.

Figure 10D:
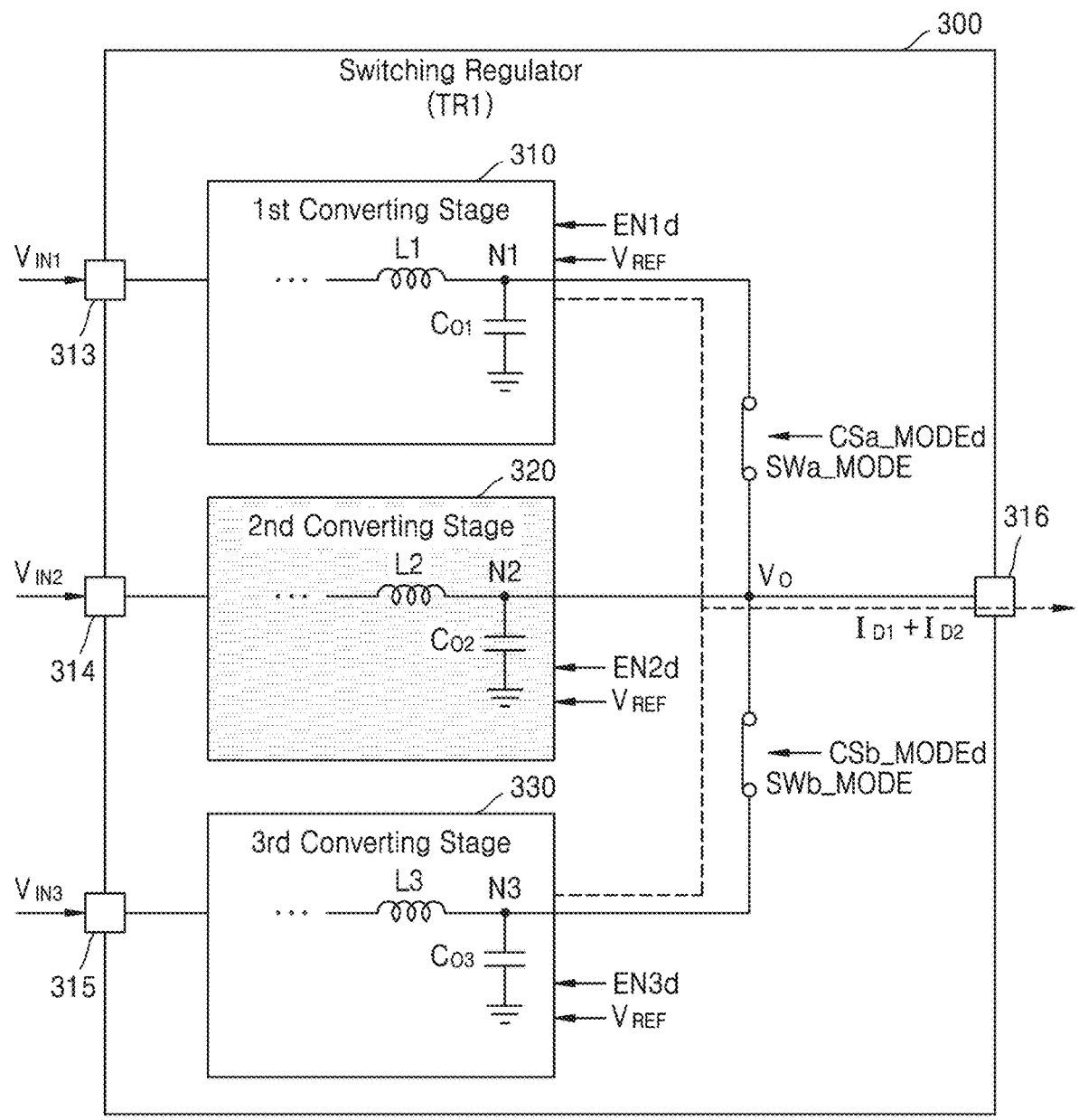

Referring to FIG. 10D for explaining the converting operation of the switching regulator 300 in the first transition mode TR1, in the first transition mode TR1, the first mode switch element SWa_MODE may be turned on by a first mode control signal CSa_MODEd, and the second mode switch element SWb_MODE may be turned on by a second mode control signal CSb_MODEd. Further, the first converting stage 310 may be enabled by a first enable control signal EN1d, the second converting stage 320 may be disabled by a second enable control signal EN2d, and the third converting stage 330 may be enabled by a third enable control signal EN3d. The first converting stage 310 and the third converting stage 330 may generate the first transfer current $I_{D1}$ and the second transfer current $I_{D2}$, which pass through the first inductor L1 and the third inductor L3 and flow toward the output terminal 316, respectively, by simultaneously performing the converting operations based on the first enable control signal EN1d and the reference voltage $V_{REF}$, and the third enable control signal EN3d and the reference voltage $V_{REF}$, respectively, and may provide the output voltage $V_O$ to the processing circuit (not shown). The switching regulator 300 may generate the stable output voltage $V_O$ by performing the converting operation using the first converting stage 310 in parallel until the stable converting operation by the third converting stage 330 becomes stable during the first transition period TR1 in which the state of the switching regulator 300 changes from the slow mode MODE_slow to the normal mode MODE_normal.

Figure 10E:
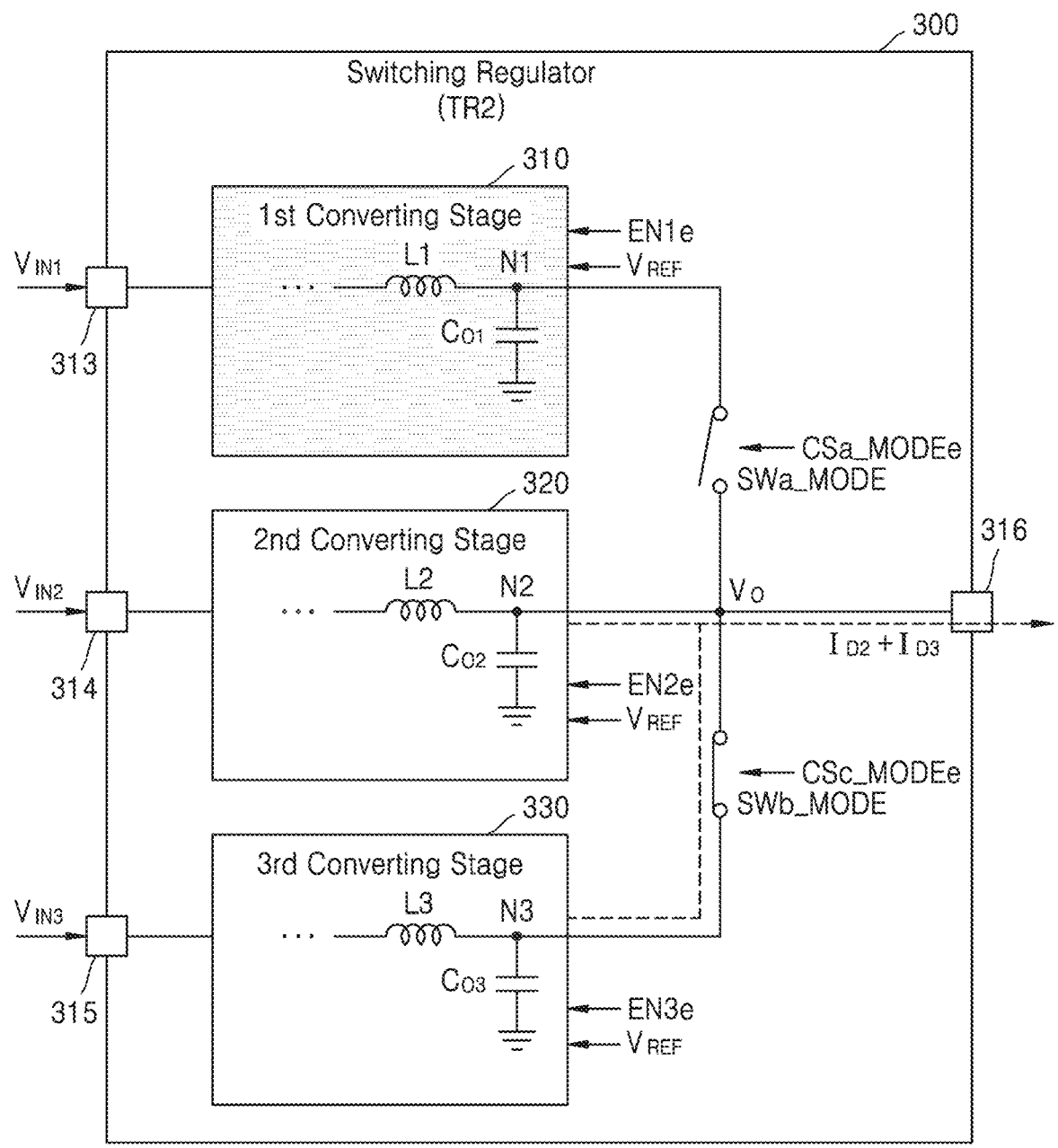

Referring to FIG. 10E for explaining the converting operation of the switching regulator 300 in the second transition mode TR2, in the second transition mode TR2, the first mode switch element SWa_MODE may be turned off by a first mode control signal CSa_MODEe, and the second mode switch element SWb_MODE may be turned on by a second mode control signal CSb_MODEe. Further, the first converting stage 310 may be disabled by a first enable control signal EN1e, the second converting stage 320 may be enabled by a second enable control signal EN2e, and the third converting stage 330 may be enabled by a third enable control signal EN3e. The second converting stage 320 and the third converting stage 330 may generate the third transfer current $I_{D3}$ and the second transfer current $I_{D2}$, which pass through the second inductor L2 and the third inductor L3 and flow toward the output terminal 316, respectively, by simultaneously performing the converting operations based on the second enable control signal EN2e and the reference voltage $V_{REF}$, and the third enable control signal EN3e and the reference voltage $V_{REF}$, respectively, and may provide the output voltage $V_O$ to the processing circuit (not shown). The switching regulator 300 may generate the stable output voltage $V_O$ by performing the converting operation using the third converting stage 330 in parallel until the stable converting operation by the second converting stage 320 becomes stable during the second transition period TR2 in which the state of the switching regulator 300 changes from the normal mode MODE_normal to the fast mode MODE_fast.

The switching regulator 300 may perform a complementary converting operation by using a plurality of converting stages in a transition period in which the converting mode changes. Because the descriptions given above should be sufficient as an explanation for this case, any further detailed descriptions thereof are omitted.

Figure 11:
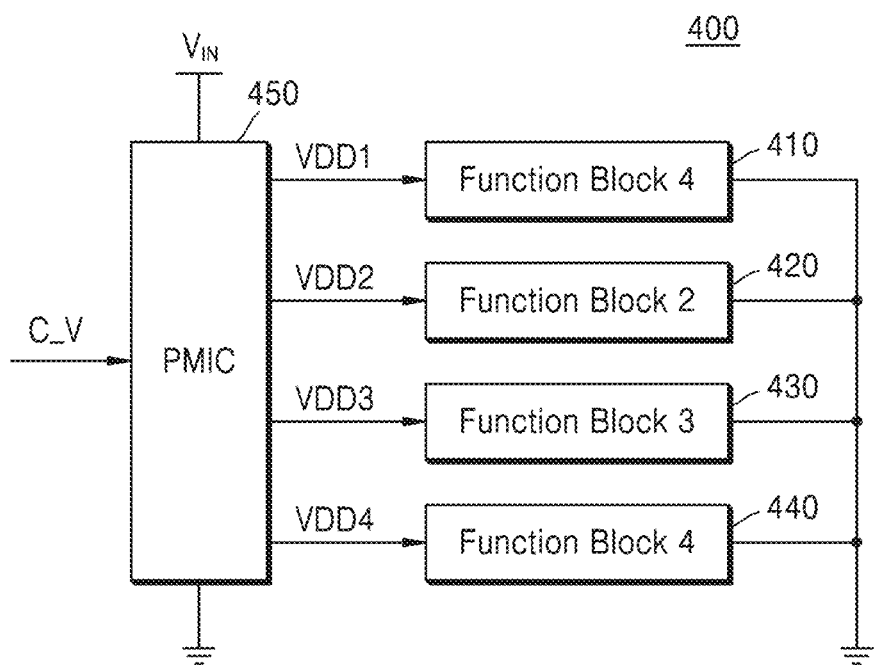
FIG. 11 is a diagram illustrating an electronic system according to an example embodiment of the inventive concepts.

FIG. 11 is a diagram illustrating an electronic system 400 according to an example embodiment of the inventive concepts. In some example embodiments, the electronic system 400 may include one semiconductor integrated circuit such as a system-on-chip (SoC), and in some other example embodiments, may include a printed circuit board and packages mounted thereon. As illustrated in FIG. 11, the electronic system 400 may include first through fourth functional blocks 410 through 440 and a power management integrated circuit (PMIC) 450.

The first through fourth functional blocks 410 through 440 may operate based on the power provided by the first through fourth supply voltages VDD1 through VDD4 output from the PMIC 450. For example, at least one of the first through fourth functional blocks 410 through 440 may include a digital circuit for processing a digital signal such as an application processor (AP), or may include an analog circuit for processing an analog signal. Further, the at least one of the first through fourth functional blocks 410 through 440 may include a circuit for processing a mixed signal such as an analog-to-digital converter (ADC). Although the electronic system 400 is illustrated as including four functional blocks in FIG. 11, in some example embodiments, the electronic system 400 may include fewer than four or more than five functional blocks.

The PMIC 450 may generate the first through fourth supply voltages VDD1 through VDD4 from an input voltage $V_{IN}$ and may change at least one level of the first through fourth supply voltages VDD1 through VDD4 according to a voltage control signal C_V. At least one of the first through fourth functional blocks 410 through 440 may receive a supply voltage of a level that varies dynamically depending on desired performance and power consumption. For example, the first functional block 410 may include an image processor for processing image data, or the first functional block 410 may receive the first supply voltage VDD1 of a high level while processing a video image that includes a series of images, or the first functional block 410 may receive the first supply voltage VDD1 of a low level while processing a photograph that includes a single image. The PMIC 450 may receive the voltage control signal C_V corresponding to the performance and power consumption desired by the first functional block 410 and may increase or decrease a level of the first supply voltage VDD1 based on the voltage control signal C_V.

The PMIC 450 may include a switching regulator described above with reference to the figures, and accordingly, may provide to the first through fourth functional blocks 410 through 440 the first through fourth supply voltages VDD1 through VDD4 having DVS rates relating to load conditions of the first through fourth functional blocks 410 through 440, respectively. To perform such operations, the switching regulator of the PMIC 450 may include a plurality of converting stages, and each of the plurality of converting stages may include one or more output capacitors. The switching regulator as illustrated in, for example, FIG. 1 may be included in the PMIC 450.

While the inventive concepts have been particularly shown and described with reference to the example embodiments disclosed herein, it will be understood that various changes in form and details may be made therein without departing from the spirit and scope of the following claims.

What is claimed is:

1. A switching regulator including:
a first converting stage including a first output capacitor connected between a first output node and ground and a first inductor connected to the first output capacitor through the first output node, and configured to generate a first output voltage on the first output node using a first input voltage;
a second converting stage including a second output capacitor connected between a second output node and the ground and a second inductor connected to the second output capacitor through the second output node, and configured to generate a second output voltage on the second output node using a second input voltage; and
an output terminal configured to be selectively connected to the first output node through a first switch element, the output terminal connected to the second output node, and the output terminal configured to provide at least one of the first output voltage or the second output voltage to a processing circuit as a supply voltage depending on an on or off state of the first switch element,
wherein a capacitance of the second output capacitor is smaller than that of the first output capacitor, and
one end of the first switch element is connected to the first output node and the other end of the first switch element is connected to the second output node.

2. The switching regulator of claim 1,
wherein an inductance of the second inductor is smaller than that of the first inductor.

3. The switching regulator of claim 1,
wherein the first input voltage is equal to or smaller than the second input voltage.

4. The switching regulator of claim 1, wherein when the processing circuit is under a light load condition,
the first converting stage is configured to generate the first output voltage to be transferred to the output terminal through the first switch element, and
the second converting stage is configured to be disabled.

5. The switching regulator of claim 1, wherein when the processing circuit is under a heavy load condition,
the first converting stage is configured to be disabled, and
the second converting stage is configured to generate the second output voltage to be transferred to the output terminal.

6. The switching regulator of claim 1,
wherein a first dynamic voltage scaling (DVS) rate of the first output voltage is slower than a second dynamic voltage scaling (DVS) rate of the second output voltage.

7. The switching regulator of claim 1,
wherein in a transition period during which a load condition of the processing circuit changes to one of a light and heavy load conditions to another of the light and heavy load conditions, the switching regulator is configured to turn on the first switch element, and enable both the first converting stage and the second converting stage to provide the supply voltage to the processing circuit.

8. The switching regulator of claim 1, wherein a level of the second input voltage is lower than that of the first input voltage.

9. The switching regulator of claim 1, further including:
a third converting stage including a third output capacitor connected between a third output node and the ground and a third inductor connected to the third output capacitor through the third output node, configured to generate a third output voltage on the third output node using a third input voltage,
wherein the output terminal further connected to the third output node through a second switch element and configured to selectively provide one of the first output voltage and the second output voltage and the third output voltage as the supply voltage to the processing circuit, and
wherein a capacitance of the third output capacitor is greater than that of the second output capacitor and smaller than that of the first output capacitor.

10. The switching regulator of claim 9, wherein when the processing circuit is under a normal load condition,
the first converting stage is configured to be disabled,
the second converting stage is configured to be disabled, and
the third converting stage is configured to generate the third output voltage to be transferred to the output terminal.

11. The switching regulator of claim 9, wherein a third dynamic voltage scaling (DVS) rate of the third output voltage is faster than a first dynamic voltage scaling (DVS) rate of the first output voltage and slower than a second dynamic voltage scaling (DVS) rate of the second output voltage.

12. An electronic system including:
at least one processing circuit; and
a switching regulator configured to provide a supply voltage to the processing circuit, the switching regulator including,
a first converting stage including at least one first output capacitor connected between a first output node and ground and at least one first inductor, and configured to generate a first output voltage on the first output node, a second converting stage including at least one second output capacitor connected between a second output node and the ground and at least one second inductor, and configured to generate a second output voltage on the second output node, and a switch element configured to selectively connect the first output node of the first converting stage to the processing circuit, wherein the second output node is configured to connect to the processing circuit, a capacitance of the first converting stage is greater than that of the second converting stage, the switching regulator is configured to provide at least one of the first output voltage or the second output voltage to the processing circuit as the supply voltage depending on an on or off state of the switch element, and one end of the switch element is connected to the first output node and the other end of the switch element is connected to the second output node.

13. The electronic system of claim 12, wherein the processing circuit configured to selectively control at least one of the first and second converting stages to generate the supply voltage.

14. The electronic system of claim 12, wherein the processing circuit configured to, when the processing circuit under a light load condition, enable the first converting stage to generate the supply voltage, turn on the switch element, and disable the second converting stage.

15. The electronic system of claim 12, wherein the processing circuit configured to, when the processing circuit under a heavy load condition, enable the second converting stage to generate the supply voltage, turn off the switch element, and disable the first converting stage.

16. The electronic system of claim 12, wherein a first dynamic voltage scaling (DVS) rate of a first output voltage generated by the first converting stage is slower than a second dynamic voltage scaling (DVS) rate of the second output voltage generated by the second converting stage.

17. The electronic system of claim 12, wherein the processing circuit configured to, when the processing circuit in a transition period during which a load condition of the processing circuit changes, enable the first and second converting stages to generate the supply voltage, and turn on the switch element.

18. A switching regulator configured to generate an output voltage from at least one of a first input voltage and a second input voltage and output the output voltage through an output terminal, the switching regulator comprising:

a first converting stage comprising a first output capacitor connected between a first output node and ground, the first converting stage configured to receive the first input voltage and adjust a level of the output voltage using the first input voltage;

a second converting stage comprising a second output capacitor connected between a second output node connected to the output terminal and the ground, the second converting stage configured to receive the second input voltage and adjust the level of the output voltage using the second input voltage, the second output node being connected to the output terminal; and a first switch element connected between the first output node and the output terminal, the first switch element configured to selectively connect the first converting stage to the output terminal, wherein a capacitance of the second output capacitor is smaller than that of the first output capacitor, the switching regulator is configured to output as the output voltage at least one of a first output voltage generated by the first converting stage on the first output node and a second output voltage generated by the second converting stage on the second output node, depending on an on or off state of the first switch element, and one end of the first switch element is connected to the first output node and the other end of the first switch element is connected to the second output node.

19. The switching regulator of claim 18, wherein when the switching regulator operates in a first mode, the switching regulator is configured to turn on the first switch element and connect the first output node to the output terminal so that the level of the output voltage is controlled by the first converting stage, and when the switching regulator operates in a second mode, the switching regulator is configured to turn off the first switch element so that the level of the output voltage is controlled by the second converting stage, a first speed of the first mode of the switching regulator being slower that a second speed of the second mode of the switching regulator.

20. The switching regulator of claim 18, wherein a level of the second input voltage is lower than that of the first input voltage.

* * * * *